US010298937B2

(12) United States Patent
Laroche et al.

(10) Patent No.: US 10,298,937 B2
(45) Date of Patent: May 21, 2019

(54) METHOD, DEVICE, COMPUTER PROGRAM, AND INFORMATION STORAGE MEANS FOR ENCODING OR DECODING A VIDEO SEQUENCE

(71) Applicant: CANON KABUSHIKI KAISHA, Tokyo (JP)

(72) Inventors: Guillaume Laroche, Melesse (FR); Edouard François, Bourg des Comptes (FR); Christophe Gisquet, Rennes (FR); Patrice Onno, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 802 days.

(21) Appl. No.: 14/146,598

(22) Filed: Jan. 2, 2014

(65) Prior Publication Data
US 2014/0192869 A1 Jul. 10, 2014

(30) Foreign Application Priority Data
Jan. 4, 2013 (GB) .................................. 1300150.8

(51) Int. Cl.
*H04N 19/117* (2014.01)
*H04N 19/176* (2014.01)
(Continued)

(52) U.S. Cl.
CPC ......... *H04N 19/176* (2014.11); *H04N 19/117* (2014.11); *H04N 19/14* (2014.11);
(Continued)

(58) Field of Classification Search
CPC ...... H04N 19/82; H04N 19/86; H04N 19/117; H04N 19/70; H04N 19/176; H04N 19/30;
(Continued)

(56) References Cited

U.S. PATENT DOCUMENTS 8,964,832 B2 * 2/2015 Chong ................. H04N 19/105
375/240.02
2010/0284458 A1 * 11/2010 Andersson ........... H04N 19/176
375/240.03
(Continued)

FOREIGN PATENT DOCUMENTS

WO 2012173403 A2 12/2012

OTHER PUBLICATIONS

"Overview of High Efficiency Video Coding (HEVC) Standard," Gary J Sullivan; Jes-Rainer Ohm; Woo-Jin Han; Thomas Weigand, IEEE Trans on Circuits and Systems for Video Technology, Jan. 12, 2012, vol. 22, pp. 1649-1668.
(Continued)

*Primary Examiner* — Tsion B Owens
*Assistant Examiner* — Kehinde Abimbola
(74) *Attorney, Agent, or Firm* — Canon U.S.A., Inc. IP Division

(57) ABSTRACT

The invention relates to video coding. A method of encoding or decoding such a video sequence according to the invention comprises: obtaining a reconstructed frame area made of an array of sample values; applying a sample adaptive offset, SAO, filtering to the reconstructed frame area based on SAO parameters; wherein at least one of the SAO parameters is determined independently of the sample values of the reconstructed frame area. Preferably, the sample-independent SAO parameters define an Edge Offset filtering.

19 Claims, 13 Drawing Sheets

(51) Int. Cl.
*H04N 19/147* (2014.01)
*H04N 19/14* (2014.01)
*H04N 19/19* (2014.01)
*H04N 19/82* (2014.01)
*H04N 19/86* (2014.01)

(52) U.S. Cl.
CPC ........... *H04N 19/147* (2014.11); *H04N 19/19* (2014.11); *H04N 19/82* (2014.11); *H04N 19/86* (2014.11)

(58) Field of Classification Search
CPC .... H04N 19/136; H04N 19/186; H04N 19/44; H04N 19/593; H04N 19/182; H04N 19/14; H04N 19/147; H04N 19/00066; H04N 19/13; H04N 19/184; H04N 19/19; H04N 19/46; H04N 19/61; H04N 19/105; H04N 19/119; H04N 19/132; H04N 19/80; H04N 19/124
See application file for complete search history.

(56) References Cited

U.S. PATENT DOCUMENTS

| | | | |
|---|---|---|---|
| 2011/0026599 A1* | 2/2011 | Andersson | H04N 19/176 375/240.16 |
| 2012/0140819 A1* | 6/2012 | Kim | H04N 19/50 375/240.03 |
| 2012/0177107 A1 | 7/2012 | Fu et al. | |
| 2012/0189064 A1* | 7/2012 | Kossentini | H04N 19/147 375/240.25 |
| 2012/0287988 A1* | 11/2012 | Chong | H04N 19/105 375/240.02 |
| 2013/0044809 A1* | 2/2013 | Chong | H04N 19/647 375/240.03 |
| 2013/0051454 A1* | 2/2013 | Sze | H04N 19/70 375/240.02 |
| 2013/0083844 A1* | 4/2013 | Chong | H04N 19/463 375/240.02 |
| 2013/0094569 A1* | 4/2013 | Chong | H04N 19/176 375/240.02 |
| 2013/0136167 A1* | 5/2013 | Chong | H04N 19/70 375/240.02 |
| 2013/0182759 A1* | 7/2013 | Kim | H04N 19/82 375/240.02 |
| 2013/0266059 A1* | 10/2013 | Chong | H04N 19/46 375/240.02 |
| 2013/0294501 A1* | 11/2013 | Sze | H04N 19/463 375/240.02 |
| 2013/0336386 A1* | 12/2013 | Chong | H04N 19/13 375/240.02 |
| 2014/0085415 A1* | 3/2014 | Bici | H04N 19/597 348/43 |
| 2014/0092975 A1* | 4/2014 | Yu | H04N 19/52 375/240.16 |
| 2014/0140406 A1* | 5/2014 | Yu | H04N 19/70 375/240.16 |
| 2014/0146875 A1* | 5/2014 | Chong | H04N 19/159 375/240.02 |
| 2014/0177704 A1* | 6/2014 | Pu | H04N 19/00533 375/240.02 |
| 2014/0185665 A1* | 7/2014 | Pu | H04N 19/00066 375/240.02 |
| 2014/0241417 A1* | 8/2014 | Chong | H04N 19/105 375/240.02 |
| 2014/0294068 A1* | 10/2014 | Andersson | H04N 19/00127 375/240.02 |
| 2014/0301489 A1 | 10/2014 | Laroche et al. | |
| 2015/0172657 A1* | 6/2015 | Chong | H04N 19/105 375/240.02 |

OTHER PUBLICATIONS

"Sample Adaptive Offset in the HEVC Standard," Chih-Ming Fu; Elena Alshina; Alexander Alshin; Yu-Wen Huang; Ching-Yeh Chen; Chia-Yang Tsai; Chih-Wei Hsu; Shaw-Min Lei; Jeong-Hoon Park; Woo-Jin Han, IEEE Trans on Circuits and Systems for Video Technology, Feb. 12, 2012, vol. 22, pp. 1755-1764.

"HEVC Complexity and Implementation Analysis," Frank Bossen; Benjamin Bross; Karsten Suhring; David Flynn, IEEE Trans on Circuits and Systems for Video Technology, vol. 22, pp. 1685-1696.

* cited by examiner

| Category | Conditions | Signal type | Offset |
|---|---|---|---|
| 1 | $C<C_{n_1}$ and $C<C_{n_2}$ | Cn1 \\ C / Cn2 | $+O_1$ |
| 2 | ($C<C_{n_1}$ and $C==C_{n_2}$) or ($C<C_{n_2}$ and $C==C_{n_1}$) | Cn1 \\_ C Cn2  or  Cn1 _/ Cn2 C | $+O_2$ |
| 3 | ($C>C_{n_1}$ and $C==C_{n_2}$) or ($C>C_{n_2}$ and $C==C_{n_1}$) | C ‾\\ Cn1 Cn2 Cn1  or  C /‾ Cn2 | $-O_3$ |
| 4 | $C>C_{n_1}$ and $C>C_{n_2}$ | C / \\ Cn1 Cn2 | $-O_4$ |
| 0 (N.A.) | None of the above | | N.A. |

METHOD, DEVICE, COMPUTER PROGRAM, AND INFORMATION STORAGE MEANS FOR ENCODING OR DECODING A VIDEO SEQUENCE

CROSS REFERENCE

This application claims the benefit of priority of Great Britain Patent Application No. 1300150.8 filed on Jan. 4, 2013, which is hereby incorporated by reference in its entirety.

FIELD OF THE INVENTION

The invention relates to the field of video coding, for example to the High Efficiency Video Coding (HEVC) standard. The invention concerns a method, device, non-transitory computer-readable medium for encoding or decoding a video sequence.

BACKGROUND OF THE INVENTION

Many video compression formats, such as for example H.263, H.264, MPEG-1, MPEG-2, MPEG-4, SVC, use block-based discrete cosine transform (DCT) and motion compensation to remove spatial and temporal redundancies. They are often referred to as predictive video formats. Each frame or image in the video signal is identified with an index known as the POC (standing for "picture order count"). Each frame or image is divided into at least one slice which is encoded and can be decoded independently. A slice is typically a rectangular portion of the frame, or more generally, a portion of a frame or an entire frame. Further, each slice may be divided into macroblocks (MBs), and each macroblock is further divided into blocks, typically blocks of 64×64, 32×32, 16×16 or 8×8 pixels.

In High Efficiency Video Coding (HEVC), blocks of from 64×64 to 4×4 may be used. The partitioning is organized according to a quad-tree structure based on largest coding units (LCUs). An LCU corresponds, for example, to a square block of 64×64. If an LCU needs to be divided, a split flag indicates that the LCU is split into four 32×32 blocks. In the same way, if any of these four blocks need to be split, the split flag is set to true and the 32×32 block is divided into four 16×16 blocks etc. When a split flag is set to false, the current block is a coding unit CU which is the frame entity to which the encoding process described below is applied. A CU has a size equal to 64×64, 32×32, 16×16 or 8×8 pixels.

Each CU can be further split into four or more transform units, TUs, which are the frame entities on which DCT and quantization operations are performed. A TU has a size equal to 32×32, 16×16, 8×8 or 4×4 pixels.

There are two families of coding modes for coding blocks of an image: coding modes based on spatial prediction, referred to as INTRA prediction and coding modes based on temporal prediction, referred to as INTER prediction. In both spatial and temporal prediction modes, a residual is computed by subtracting the predictor from the original block.

An INTRA block is generally predicted by an INTRA prediction process from the encoded pixels at its causal boundary. In INTRA prediction, a prediction direction is encoded.

Temporal prediction consists in finding in a reference frame, either a previous or a future frame of the video sequence, an image portion or reference area which is the closest to the block to be encoded. This step is typically known as motion estimation. Next, the block to be encoded is predicted using the reference area in a step typically referred to as motion compensation—the difference, known as residual, between the block to be encoded and the reference portion is encoded in a bitstream, along with an item of motion information relative to the motion vector which indicates the reference area to use for motion compensation. In temporal prediction, at least one motion vector is encoded.

Effective coding chooses the best coding mode between INTER and INTRA coding for each coding unit in an image to provide the best trade-off between image quality at the decoder and reduction of the amount of data to represent the original data to encode.

The residual resulting from the prediction is then subjected to DCT transform and quantization.

Both encoding and decoding processes involve in general a decoding process of an encoded frame. This process called close loop decoding is typically performed at the encoder side for the purpose of producing the same reference frames at the encoder than those used by the decoder during the decoding process.

To reconstruct the encoded frame, the residual is inverse quantized and inverse transformed in order to provide the "decoded" residual in the pixel domain. The "decoded" residual is added to the spatial or temporal predictor used above, to obtain a first reconstruction of the frame.

The first reconstruction is then filtered by one or several kinds of post filtering processes. These post filters are applied on the reconstructed frame at encoder side and the decoder side again in order that the same reference frame is used at both sides.

The aim of this post filtering is to remove compression artifacts and improve image quality. For example, H.264/AVC uses a deblocking filter. This filter can remove blocking artifacts due to the DCT quantization of residual and to block motion compensation. These artifacts are visually important at low bitrates. The deblocking filter operates to smooth the block boundaries according to the characteristics of two neighboring blocks. In the current HEVC standard, two types of loop filters are used generally consecutively: deblocking filter and sample adaptive offset (SAO).

The aim of the SAO loop filter is to improve frame reconstruction by sending additional data as opposed to a deblocking filter where no information is transmitted.

Conventional SAO filtering uses a rate distortion criterion to find the best SAO parameters, e.g. SAO filtering type, Edge Offset direction or Band Offset start, offsets. Usually such rate distortion criterion cannot be implemented at the decoder.

Implementing a SAO loop filtering at the encoder thus requires that the SAO parameters are transmitted in the bitstream to the decoder. Since SAO parameters are determined for each frame area, often each LCU, a great number of SAO parameters has to be transmitted.

This has a non-negligeable rate cost with regards to the transmitted bitstream, but also requires a SAO memory buffer that is sufficiently sized at the decoder to receive and store useful SAO parameters.

In addition, the current way of determining the best SAO parameters appears quite complex and resource-demanding for real time applications at the encoder and decoder.

SUMMARY OF THE INVENTION

The present invention has been devised to address at least one of the foregoing concerns, in particular to provide SAO loop filtering with reduced complexity.

According to a first aspect of the invention, there is provided a method of encoding or decoding a video sequence, the method comprising decoding an encoded frame into a decoded frame, wherein decoding the encoded frame comprises:

obtaining a reconstructed frame area made of an array of sample values;

applying a sample adaptive offset, SAO, filtering to the reconstructed frame area based on SAO parameters;

wherein at least one of the SAO parameters is determined independently of the sample values of the reconstructed frame area.

The method of the invention reduces complexity of determining the SAO parameters, be it at the encoder or decoder. This is particularly significant for real time applications.

This is achieved by obtaining SAO parameters independently of the pixel values of the frame area that is processed. This is because, usually, computation based on the pixels values of the frame area proves to be complex and very demanding for the computing device. Data other than the pixel values that are well chosen make it possible to lighten processing.

In addition, the same light processing could therefore be implemented at the decoder, thus avoiding transmitting all or part of the SAO parameters in the bitstream.

According to a second aspect of the invention, there is provided a device for encoding or decoding a video sequence, comprising an internal decoder configured to decode an encoded frame into a decoded frame, wherein the internal decoder comprises:

a frame area module configured to obtain a reconstructed frame area made of an array of sample values;

a sample adaptive offset, SAO, filter configured to apply a SAO filtering to the reconstructed frame area based on SAO parameters;

a SAO parameter determining module configure to determine at least one of the SAO parameters independently of the sample values of the reconstructed frame area.

The device provides similar advantages than the above-defined method. Optional features of the method or of the device are defined in the appended claims and summarized below.

In one embodiment, the SAO parameters include a SAO filtering type, a SAO-type-depending parameter and offsets, wherein the at least one SAO parameter includes the offsets. This provision complies with Edge Offset filtering and Band Offset filtering, for which the SAO-type-depending parameter is respectively the Edge Offset direction and the Band Offset range start.

According to a particular feature, the offsets of the at least one SAO parameter includes four prefixed offsets equal to $\{1, 0, 0 -1\}$. This provision highly decreases the complexity of determining SAO parameters. Thus it is advantageously implemented at both the encoder and decoder, thus avoiding transmitting the offsets in the bitstream.

According to another particular feature, the offsets of the at least one SAO parameter includes four offsets O1, O2, O3, O4 such that O1>O2=0=O3>O4 and |O1|=|O4|, where |x| is the absolute value of x. This implementation also reduces complexity when determining the SAO offsets to be used, since two of them are set to 0. The inventors have observed that using offsets equal to 0 for the two middle categories does not affect SAO filtering efficiency a lot.

According to yet another particular feature, the offsets of the at least one SAO parameter includes four offsets O1, O2, O3, O4 such that O1>O2≥0≥O3>O4 and |O1|=|O4| and |O2|=|O3|=|O1|/2, where |x| is the absolute value of x. In this embodiment, the four offsets thus directly derive from a single main offset, using low complexity derivation mechanisms. This also contributes to a low complexity SAO management.

According to yet another particular feature, the offsets of the at least one SAO parameter includes four offsets O1, O2, O3, O4 such that O1>O2≥0≥O3>O4 and |O1|=|O4| and |O2|=|O3|, where |x| is the absolute value of x; and the offsets depend on a quantization parameter used to decode a frame area of the encoded frame. This implementation is particularly advantageous when the Edge Offset SAO filtering is implemented as the SAO filtering. This is because Edge Offset SAO aims at correcting quantization artifacts. Thus, taking into account the quantization parameter (i.e. the reason of the quantization artifacts) makes it possible to obtain efficient SAO filtering.

In particular, the absolute values of the offsets, e.g. |O1| and |O4|, are increased when a quantization parameter associated with the reconstructed frame area (at Coding Unit level or at frame level) exceeds a first threshold value, i.e. when the QP increases. This is because the quantization artifacts increase with the increase of the quantization parameter. Thus the offsets are preferably increased to maintain SAO filtering efficiency.

According to yet another particular feature, the offsets of the at least one SAO parameter includes four offsets O1, O2, O3, O4 such that O1>O2≥0≥O3>O4 and |O1|=|O4| and |O2|=|O3|, where |x| is the absolute value of x; and the offsets depend on a size or number of transform units partitioning the reconstructed frame area. This is because the bigger the transform units, the more the quantization artifacts resulting from quantization on the transform units can be corrected by SAO filtering. Moreover, the use of a large number of transform units partitioning should generate quantization artifacts. The above provisions thus offer to keep video quality by balancing the increase in quantization artifacts with adaptation of the SAO filtering through the choice of appropriate offsets.

In particular, the absolute values of the offsets, e.g. |O1| and |O4|, are increased when the size of the transform units exceeds a second threshold value, i.e. when the TU size increases. Similarly, the absolute values of the offsets, e.g. |O1| and |O4|, are increased when the number of the transform units exceeds a third threshold value, i.e. when the number of TUs increases. These embodiments ensure compensation of quantization artifacts.

According to yet another particular feature, the offsets of the at least one SAO parameter includes four offsets O1, O2, O3, O4 such that O1>O2≥0≥O3>O4 and |O1|=|4| and |O2|=|O3|, where |x| is the absolute value of x; and the offsets depend on a bit depth used to store the sample values. This is to scale the offset values to the bit depth used for the sample processed.

In particular, the absolute values of the offsets, e.g. |O1| and |O4|, are increased when the bit depth exceeds a fourth threshold value, i.e. when the bit depth increases. This is because, as the bit depth used for the sample values increases, the same offset values appear each time smaller. The above provision thus provides an accurate compensation to upscale the offsets.

In one embodiment of the invention, the at least one SAO parameter further includes the SAO filtering type. This also contributes to decrease complexity when processing SAO filtering. This is because conventional methods for determining SAO parameters use complex rate distortion measures involving the pixel values, between various SAO filtering types to select the best one. The above provision avoids performing such complex measure based on pixel values.

In particular, the SAO filtering type determined independently of the sample values may be set to Edge Offset filtering. By forcing Edge Offset filtering, better video quality is obtained.

In another embodiment of the invention, the at least one SAO parameter includes all the SAO parameters, including the SAO-type-depending parameter. This reduces complexity on determining each of the SAO parameters.

In yet another embodiment of the invention, the SAO filtering type is a SAO Edge Offset filtering and the SAO-type-depending parameter is a direction of Edge Offset filtering.

According to a particular feature, the Edge Offset direction is prefixed for a plurality of frames of the video sequence. This advantageously saves Edge Offset direction determination for each frame area compared to conventional SAO filtering. It results that complexity in processing SAO filtering at the encoder and decoder is substantially decreased. Preferably, the prefixed Edge Offset direction is a horizontal direction, i.e. 0-degree direction.

In a variant, the Edge Offset direction is selected for each new frame within the video sequence, for example based on a picture order count associated with each new frame. For the same reasons as above, this also substantially decreases complexity in processing SAO filtering, at a lower level. Using the POC as criterion to determine the Edge Offset direction also contributes to the complexity decrease, since this information is easily retrieved and used.

In particular, vertical and horizontal Edge Offset directions are favored for selection compared to diagonal Edge Offset directions. Indeed, the vertical and horizontal directions prove to be more efficient, because the frames usually comprise more horizontal and vertical outlines than diagonal outlines. According to a more particular feature, the diagonal Edge Offset directions are disabled for selection. This further decreases complexity in processing the SAO filtering, since fewer directions have to be considered.

According to another particular feature, the Edge Offset direction is perpendicular to an Edge Offset direction determined for a co-located frame area in another frame of the video sequence. For example the other frame can be a previously encoded/decoded frame of the video sequence, in particular a frame having the same or a lower depth according to a temporal prediction frame hierarchy driving temporal prediction between the frames of the video sequence.

Again, since the Edge Offset direction is already available for the other frame, the Edge Offset direction for the current frame area is obtained without complexity.

According to yet another particular feature, the Edge Offset direction is determined based on a motion vector associated with the reconstructed frame area. The inventors have observed that a significant correlation between the motion vector and the most efficient Edge Offset direction exists in case of INTER-predicted frame areas. In this context, using motion vector to determine part of the SAO parameters proves to be of lower complexity than using the numerous pixel values forming the frame area.

In particular, the Edge Offset direction is the closest direction to a perpendicular of the motion vector, from amongst predefined directions. The predefined directions may be the four Edge Offset directions conventionally known. The inventors have observed that the above provision provides the best results for INTER frame areas.

According to yet another particular feature, the Edge Offset direction is determined based on a direction for spatial prediction associated with the reconstructed frame area. The inventors have observed that a significant correlation between the INTRA prediction direction and the most efficient Edge Offset direction exists in case of INTRA-predicted frame areas. In this context, using spatial prediction direction to determine part of the SAO parameters proves to be of lower complexity than using the numerous pixel values forming the frame area.

In particular, the Edge Offset direction is the closest direction to a perpendicular of the spatial prediction direction, from amongst predefined directions. The predefined directions may be the four Edge Offset directions conventionally known. The inventors have observed that the above provision provides the best results for INTRA frame areas.

In yet another embodiment of the invention, frames of the video sequence are encoded using temporal prediction according to a temporal prediction frame hierarchy between frames; and the SAO filtering is enabled for frame areas belonging to a frame having a lower depth according to the temporal prediction frame hierarchy, the SAO filtering is disabled for frame areas belonging to a frame having a higher depth according to the temporal prediction frame hierarchy, and enabling SAO filtering for frame areas belonging to a frame having a middle depth according to the temporal prediction frame hierarchy depends on at least one parameter which modifies or impacts the quality and/or the rate of the frames, for example on quantization parameters associated with the depths or on Lagrange parameter $\lambda$.

This provision uses a frame-based approach to enable or disable SAO filtering. This is to further reduce SAO filtering while preserving video quality. This is because the provision favors SAO filtering to the frames that play a central role in temporal prediction, i.e. that are liable to affect the encoding of a number of other frames. Disabling SAO filtering from the other frames substantially decreases complexity in processing SAO filtering while affecting the video quality very little.

In yet another embodiment of the invention, SAO parameters are determined for another frame of the video sequence based on rate distortion criterion; and the SAO parameters to be used for SAO-filtering the reconstructed frame area are:
  by-default SAO parameters if the SAO parameters determined for a co-located frame area in the other frame define no SAO filtering or a Band Offset filtering,
  the same SAO parameters, except a perpendicular Edge Offset direction, as those determined for a co-located frame area in the other frame if those determined parameters define an Edge Offset filtering.

This provision substantially decreases complexity in processing SAO filtering compared to conventional SAO filtering, since SAO parameters are inferred or derived from known SAO parameters of a previously processed frame, wherein the use of by-default SAO parameters avoids computing any data when the known SAO parameters are of some types.

In yet another embodiment of the invention, the method further comprises cascading several SAO filterings on the reconstructed frame area based on respective sets of SAO parameters, wherein at least one SAO parameter of each respective set of SAO parameters is determined independently of the sample values of the reconstructed frame area. This provision provides increase in video quality at low cost, since complexity in processing each SAO filtering is low due to the teachings of the present invention.

According to a particular feature, four Edge Offset SAO filterings are cascaded, for example corresponding to four different Edge Offset directions.

In a variant, three Edge Offset SAO filterings are cascaded corresponding to three Edge Offset directions that are different from an Edge Offset direction determined for a co-located frame area in another frame of the video sequence. Indeed, it may be considered that a first direction has already been corrected in the co-located frame area, and thus it may be worth correcting the other directions in a new frame area. This may smooth the video rendering over several frames.

According to another particular feature, the bitstream comprises a plurality of flags to specify whether associated Edge Offset directions are enabled or not. This provision makes it possible to vary the number of cascaded SAO filtering as the frame areas are processed. The flags may be provided at the frame area level or at another level.

According to yet another particular feature, the direction of the SAO filtering first occurring in the cascade is determined based on a motion vector associated with the reconstructed frame area. In a variant, the direction of the SAO filtering first occurring in the cascade is determined based on a direction for spatial prediction associated with the reconstructed frame area. In another variant, the direction of the SAO filtering first occurring in the cascade is determined based on an Edge Offset direction determined for a co-located frame area in another frame of the video sequence. These various embodiments provide a low complexity way to determine an efficient Edge Offset direction for SAO filtering.

According to yet another particular feature, the several cascaded SAO filterings uses the same set of offsets. For example, the same set of offsets can be the set {1, 0, 0 −1} as defined above. This provision contributes to save complexity in cascading SAO filtering.

In all the embodiments described above, the reconstructed frame area may be a frame area of the encoded frame reconstructed through decoding. In this situation, SAO filtering according to the invention may be implemented in replacement of the conventional post-filtering of SAO type.

Another aspect of the invention relates to a non-transitory computer-readable medium storing a program which, when executed by a microprocessor or computer system in a device, causes the device to perform the steps of the above-defined method.

The non-transitory computer-readable medium may have features and advantages that are analogous to those set out above and below in relation to the method for encoding or decoding a video sequence, in particular that of achieving efficient SAO filtering with low complexity.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other particularities and advantages of the invention will also emerge from the following description, illustrated by the accompanying drawings, in which.

DETAILED DESCRIPTION OF EMBODIMENTS OF THE INVENTION

As briefly introduced above, the present invention relates to video coding and decoding, and more particularly to the determination of all or part of a sample adaptive offsets (SAO) scheme that decreases processing complexity compared to conventional SAO filtering.

A description of non-scalable encoder and decoder is first given with reference to FIGS. 1 to 10, in which embodiments of the invention may be implemented. Then a description of scalable encoder and decoder is given with reference to FIGS. 11 to 14, in which embodiments of the invention may also be implemented.

Figure 1:
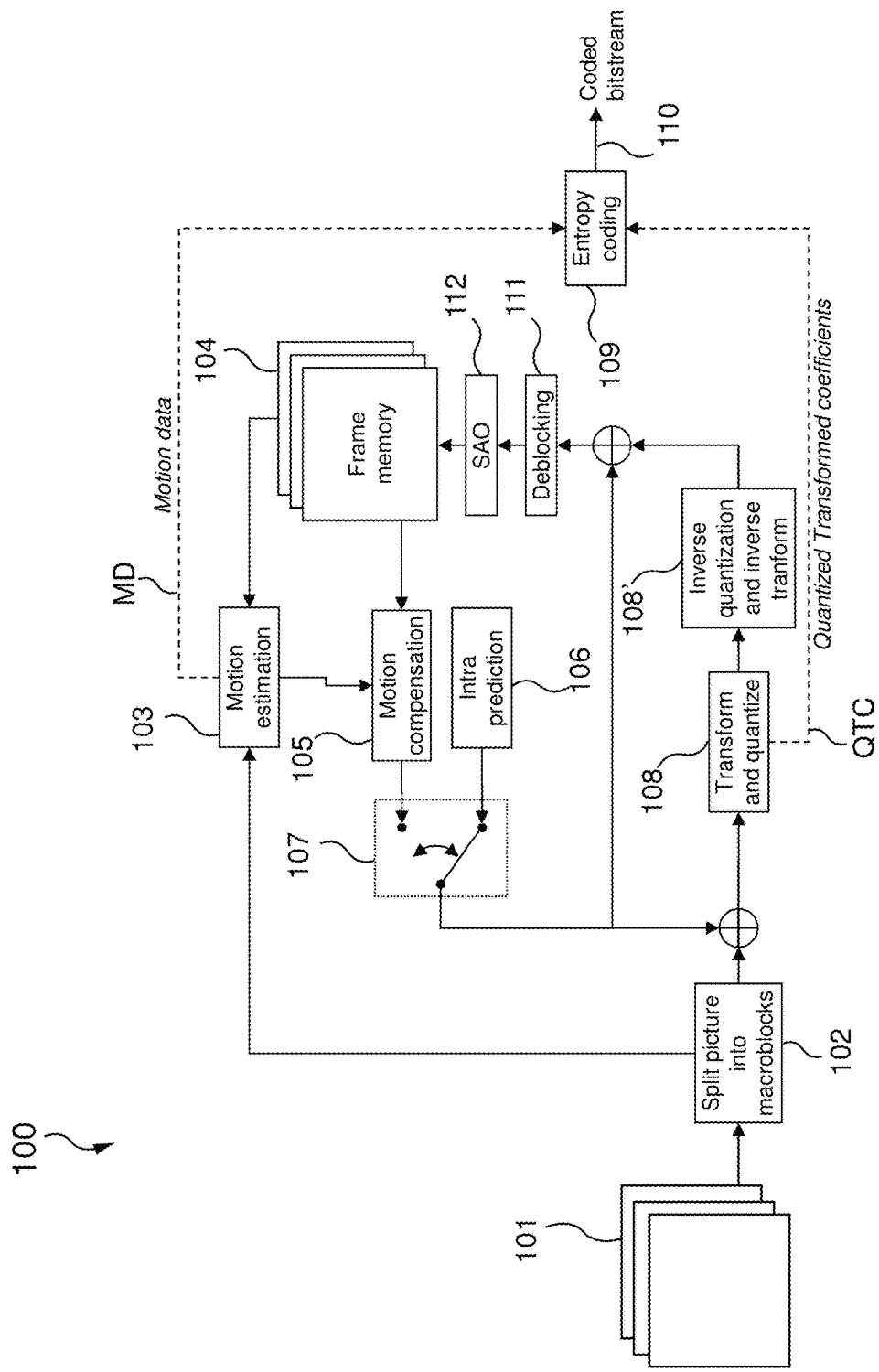
FIG. 1 illustrates a video encoder, compliant with the HEVC standard for video compression in which embodiments of the invention may be implemented.

FIG. 1 illustrates a video encoding device, of a generic type, conforming to the HEVC or H.264/AVC video compression system. A block diagram 100 of an HEVC or H.264/AVC encoder is shown.

The input to this non-scalable encoder consists in the original sequence of frame images 101 to compress. The encoder successively performs the following steps to encode a standard video bit-stream regarding a particular component, for example a Luma component or a Chroma component.

A first image or frame to be encoded (compressed) is divided into pixel blocks, called coding units (CUs) in the HEVC standard. The first frame is thus split into blocks or macroblocks.

Each block of the frame first undergoes a motion estimation operation 103, which comprises a search, among reference images stored in a dedicated memory buffer 104, for reference blocks that would provide a good prediction of the current block. This motion estimation step provides one or more reference image indexes which contain the found reference blocks, as well as the corresponding motion vectors. A motion compensation step 105 then applies the estimated motion vectors on the found reference blocks and uses it to obtain a residual block that will be coded later on if INTER coding is ultimately selected.

Moreover, an Intra prediction step 106 determines the spatial prediction mode that would provide the best performance to predict the current block and encode it in INTRA mode.

Afterwards, a coding mode selection mechanism 107 chooses the coding mode, among the spatial (INTRA) and temporal (INTER) predictions, which provides the best rate distortion trade-off in the coding of the current block.

The difference between the current block 102 (in its original version) and the prediction block obtained through Intra prediction or motion compensation (not shown) is calculated. This provides the (temporal or spatial) residual to compress.

The residual block then undergoes a transform (DCT) and a quantization 108. The quantization is based on quantization parameters (QP) input by a user. For example a QP is provided at the frame or sequence level (and indicated in a frame header of the bitstream for the decoder). In addition a QP difference, known as ΔQP, is also provided at the frame or sequence level (i.e. indicated in the frame header), and another ΔQP is optionally provided at the CU level (i.e. it is indicated in a header specific to the CU). In use, the QP and ΔQPs are added together to provide a particular QP parameter for each CU, based on which the quantization step is conducted.

Entropy coding 109 of the so-quantized coefficients QTC (and associated motion data MD) is performed. The compressed texture data associated to the coded current block is sent, as a bitstream 110, for output.

Finally, the current block is reconstructed by scaling and inverse transform 108'. This comprises inverse quantization (using the same parameters for quantization) and inverse transform, followed by a sum between the inverse transformed residual and the prediction block of the current block.

Then, the current frame, once reconstructed, is filtered. The current HEVC standard includes one or more in-loop post-filtering processes, selected for example from a deblocking filter 111 and a sample adaptive offset (SAO) filter 112.

The in-loop post-filtering processes aim at reducing the blocking artifact inherent to any block-based video codec, and improve the visual quality of the decoded image (here the reference image in memory 104) and thus the quality of the motion compensation of the following frames.

In the figure, only two post-filtering processes are implemented, namely the deblocking filter 111 and the SAO filter 112.

The post-filtering is generally applied block by block or LCU by LCU (which requires several blocks to be reconstructed before applying the post-filtering) to the reconstructed frame, according to the HEVC standard.

Embodiments of the invention apply to the SAO filter 112.

Once the reconstructed frame has been filtered by the two post-filtering, it is stored in the memory buffer 104 (the DPB, Decoded Picture Buffer) so that it is available for use as a reference image to predict any subsequent frame to be encoded.

Finally, a last entropy coding step is given the coding mode and, in case of an INTER coding mode, the motion data MD, as well as the quantized DCT coefficients previously calculated. This entropy coder encodes each of these data into their binary form and encapsulates the so-encoded block into a container called NAL unit (Network Abstract Layer). A NAL unit contains all encoded coding units (i.e. blocks) from a given slice. A coded HEVC bit-stream consists in a series of NAL units.

Figure 2:
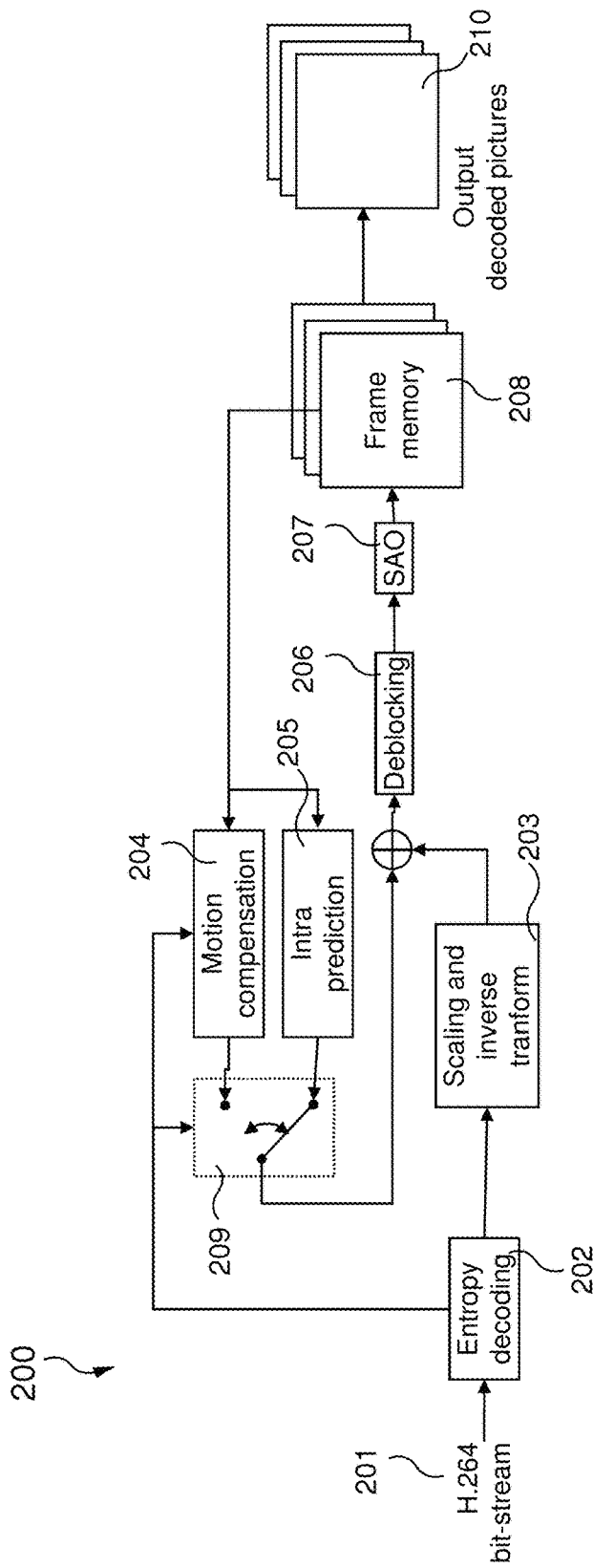
FIG. 2 illustrates a block diagram of a decoder, compliant with standard HEVC or H.264/AVC and reciprocal to the encoder of FIG. 1.

FIG. 2 provides a block diagram of an HEVC or H.264/AVC decoding system 200. This decoding process of a H.264 bit-stream 201 starts by the entropy decoding 202 of each block (array of pixels) of each coded frame from the bit-stream. This entropy decoding provides the coding mode, the motion data (reference image indexes, motion vectors of INTER coded macroblocks) and residual data. This residual data consists in quantized and transformed DCT coefficients. Next, these quantized DCT coefficients undergo inverse quantization (scaling) and inverse transform operations 203. The same QP parameters as those used at the encoding are used for the inverse quantization. To be precise, these QP parameters are retrieved from frame and CU headers in the bitstream.

The decoded residual is then added to the temporal 204 or Intra 205 prediction macroblock (predictor) for the current macroblock, to provide the reconstructed macroblock. The choice 209 between INTRA or INTER prediction depends on the prediction mode information which is retrieved from the bitstream by the entropy decoding step.

The reconstructed macroblock finally undergoes one or more in-loop post-filtering processes, e.g. deblocking 206 and SAO filtering 207. Again, the post-filtering is applied block by block or LCU by LCU in the same way as done at the encoder.

Embodiments of the invention apply to the SAO filtering 207.

The full post-filtered frame is then stored in the Decoded Picture Buffer (DPB), represented by the frame memory 208, which stores images that will serve as references to predict future frames to decode. The decoded frames 210 are also ready to be displayed on screen.

As the present invention regards SAO filtering, details on conventional SAO filtering are now given with reference to FIGS. 3 to 10.

The in-loop SAO post-filtering process aims at improving the quality of the reconstructed frames and requires, contrary to the deblocking filter, to send additional data (SAO parameters) in the bitstream for the decoder to be able to perform the same post-filtering as the encoder in the decoding loop.

The principle of SAO filtering a frame area of pixels is to classify the pixels in classes and to provide correction to the pixels by adding the same offset value or values to the pixel samples having the same class.

SAO loop filtering provides two types of classification for a frame area, in particular for a LCU: Edge Offset SAO type and Band Offset SAO type.

The Edge classification tries to identify the edges form of a SAO partition according to a direction. The Band Offset classification splits the range of pixel values into bands of pixel values.

In order to be more adaptive to the frame content, SAO filtering is applied on several frame areas which divide the current frame into several spatial regions. Currently, frame areas correspond to a finite number of the Largest Coding Units in HEVC. Consequently, each frame area may or may not be filtered by SAO filtering resulting in only some frame areas being filtered. Moreover, when SAO filtering is enabled, only one SAO classification is used for a given LCU: Edge Offset or Band Offset according to the related parameters transmitted for each classification. Finally, for each SAO filtering applied to a frame area, the SAO classification as well as its sub-parameters and the offsets are transmitted. These are the SAO parameters.

An image of video data to be encoded may be provided as a set of two-dimensional arrays (also known as colour channels) of sample values, each entry of which represents the intensity of a colour component such as a measure of luminance intensity and chrominance intensity from neutral grayscale colour toward blue or red (YUV) or as a measure of red, green, or blue light component intensity (RGB). A YUV model defines a colour space in terms of one luma (Y) and two chrominance (UV) components. Generally, Y stands for the luminance component and U and V are the chrominance (color) or chroma components.

SAO filtering is typically applied independently on Luma and on both U and V Chroma components. Below, only one color component is considered. The parameters described below can then be indexed by the color component when several color components are considered.

SAO loop filtering is applied LCU by LCU (64×64 pixels), meaning that the SAO partitioning of the frame and the classification is LCU-based. SAO parameters, including the offsets, the type of SAO classification and possibly SAO-type-depending parameters (e.g. direction of Edge as described below defining a set of categories for the Edge SAO type), are thus generated or selected for each LCU at the encoder side and need to be transmitted to the decoder.

The present invention concerns the determination and selection of all or part of the SAO parameters.

The SAO filtering type selected for each LCU is signalled to the decoder using the SAO type parameter sao_type_idx. Incidentally, this parameter is also used to indicate when no SAO filtering is to be carried out on the LCU. For this reason, the value of the parameter varies from zero to two, for example as follows:

TABLE 1 sao type idx parameter

| sao type idx | SAO type | SAO type meaning |
| --- | --- | --- |
| 0 | none | No SAO filtering is applied on the frame area |
| 1 | band | Band offset (band position needed as supplemental info) |
| 2 | edge | Edge offset (direction needed as supplemental info) |

In case several color components are considered, the parameter is indexed by the color components, for example sao_type_idx_X, where X takes the value Y or UV according to the color component considered (the chroma components are processed in the same way).

Figures 3A, 3B:
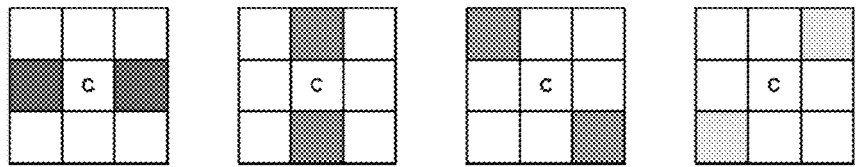
FIGS. 3a and 3b graphically illustrate a sample adaptive Edge offset classification of an HEVC process of the prior art.

Edge offset classification involves determining a class for a LCU wherein for each of its pixels, the corresponding pixel value is compared to the pixel values of two neighboring pixels. Moreover, the two neighboring pixels are selected depending on a parameter which indicates the direction of the two neighboring pixels to be considered. As shown in FIG. 3a, the possible directions for a pixel "C" are a 0-degree direction (horizontal direction), a 45-degree direction (diagonal direction), a 90-degree direction (vertical direction) and a 135-degree direction (second diagonal direction). The directions form the classes for the Edge Offset classification. A direction to be used is given by an SAO-Edge-depending parameter referred to as sao_type_class or sao_eo_class since SAO type=Edge offset (eo) (sao_eo_class_X where X=luma or chroma in case of several color components) in the last drafted HEVC specifications (HM6.0). Its value varies from zero to three, for example as follows:

TABLE 2 sao eo class parameter

| sao eo class (J) | Direction of Edge Offset |
| --- | --- |
| 0 | 0° |
| 1 | 45° |
| 2 | 90° |
| 3 | 135° |

For the sake of illustration, the offset to be added to a pixel value (or sample) C can be determined, for a given direction, according to the rules as stated in the table of FIG. 3b wherein $Cn_1$ and $Cn_2$ designate the value of the two neighboring pixels or samples (according to the given direction).

Accordingly, when the value C is less than the two values $Cn_1$ and $Cn_2$, the offset to be added to C is $+O_1$, when it is less than $Cn_1$ or $Cn_2$ and equal to the other value ($Cn_1$ or $Cn_2$), the offset to be used is $+O_2$, when it is greater than $Cn_1$ or $Cn_2$ and equal to the other value ($Cn_1$ or $Cn_2$), the offset to be used is $-O_3$, and when it is greater than $Cn_1$ and $Cn_2$, the offset to be used is $-O_4$. When none of these conditions are met, no offset value is added to the current pixel value C.

It is to be noted that according to the Edge Offset mode, only the absolute value of each offset is encoded in the bitstream, the sign to be applied being determined as a function of the category to which the current pixel belongs. Therefore, according to the table shown in FIG. 3b, a positive offset is associated with the categories 1 and 2 while a negative offset is associated with categories 3 and 4. The information about the category of each pixel does not need to be encoded in the bitstream since it is directly retrieved from the pixel values themselves.

Four specific offsets can be provided for each Edge direction. In a variant, the same four offsets are used for all the Edge directions. This is described below.

At the encoder, the selection of the best Edge Offset direction (i.e. of the classification) can be performed based on rate-distortion criterion. For example, starting from a given LCU, the latter is SAO-filtered using a first direction (J=1), the table of FIG. 3B and predetermined offsets as described below, thus resulting in a SAO-filtered LCU. The distortion resulting from the SAO filtering is calculated, for example by computing the difference between the original LCU (from stream 101) and the SAO-filtered LCU and then by computing the L1-norm or L2-norm of this difference.

The distortion for the other directions (J=2, J=3, J=4) and even for class J=N.A (no SAO filtering) are calculating in a similar manner.

The direction/class having the lowest distortion is selected.

Figure 4:
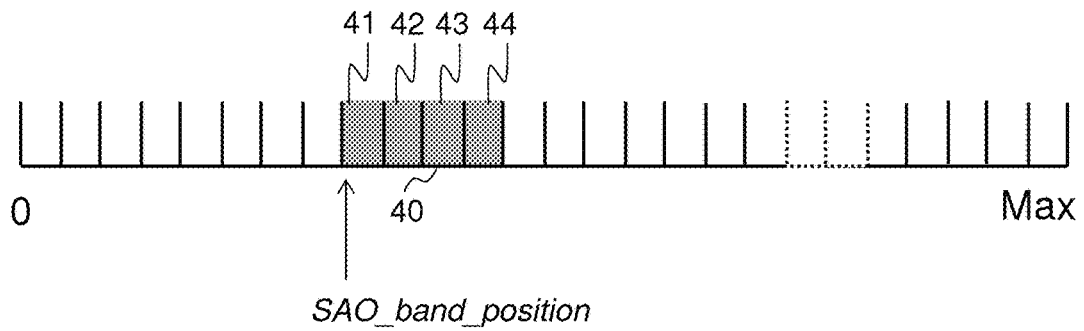
FIG. 4 graphically illustrates a sample adaptive Band offset classification of an HEVC process of the prior art.

The second type of classification is a Band offset classification which depends on the pixel value. A class in an SAO Band offset corresponds to a range of pixel values. Thus, the same offset is added to all pixels having a pixel value within a given range of pixel values. In the current HEVC specifications, four contiguous ranges of values define four classes with which four respective offsets are associated as schematically shown in FIG. 4. No offset is added to pixels belonging to the other ranges of pixels.

A known implementation of SAO Band offset splits the range of pixel values into 32 predefined ranges of the same size as schematically shown in FIG. 4. The minimum value of the range of pixel values is always zero and the maximum value depends on the bit-depth of the pixel values according to the following relationship Max=$2^{Bitdepth}-1$.

Splitting the full range of pixel values into 32 ranges enables the use of five bits for classifying each pixel, allowing a fast classification. Accordingly only five bits are checked to classify a pixel in one of the 32 classes or ranges of the full range. This is generally done by checking the five most significant bits, MSBs, of values encoded on 8 bits.

For example, when the bit-depth is 8 bits, the maximum possible value of a pixel is 255. Thus, the range of pixel values is between 0 and 255. For this bit-depth of 8 bits, each class includes a range of 8 pixel values.

The aim of the SAO Band filtering is the filtering of pixels belonging to a group of four consecutive classes or ranges that is defined by the first class. The definition of the first class is transmitted in the bitstream so that the decoder can determine the four consecutive classes or ranges of the pixels to be filtered. A parameter representing the position of the first class is referred to as sao_type_position or sao_band_position (SAO type=Band offset) in the current HEVC specifications.

For the sake of illustration, a group of four consecutive classes or ranges 41 to 44 of pixels to be filtered is represented in FIG. 4 as a grey area. As described above, this group can be identified by its position (i.e. sao_band_position) representing the start of the first class 41, i.e. the value 64 in the depicted example. According to the given example, class or range 41 relates to pixels having values comprised between 64 and 71. Similarly, classes or ranges 42 to 44 relate to pixels having values comprised between 72 and 79, 80 and 87, 88 and 96, respectively.

Figure 5:
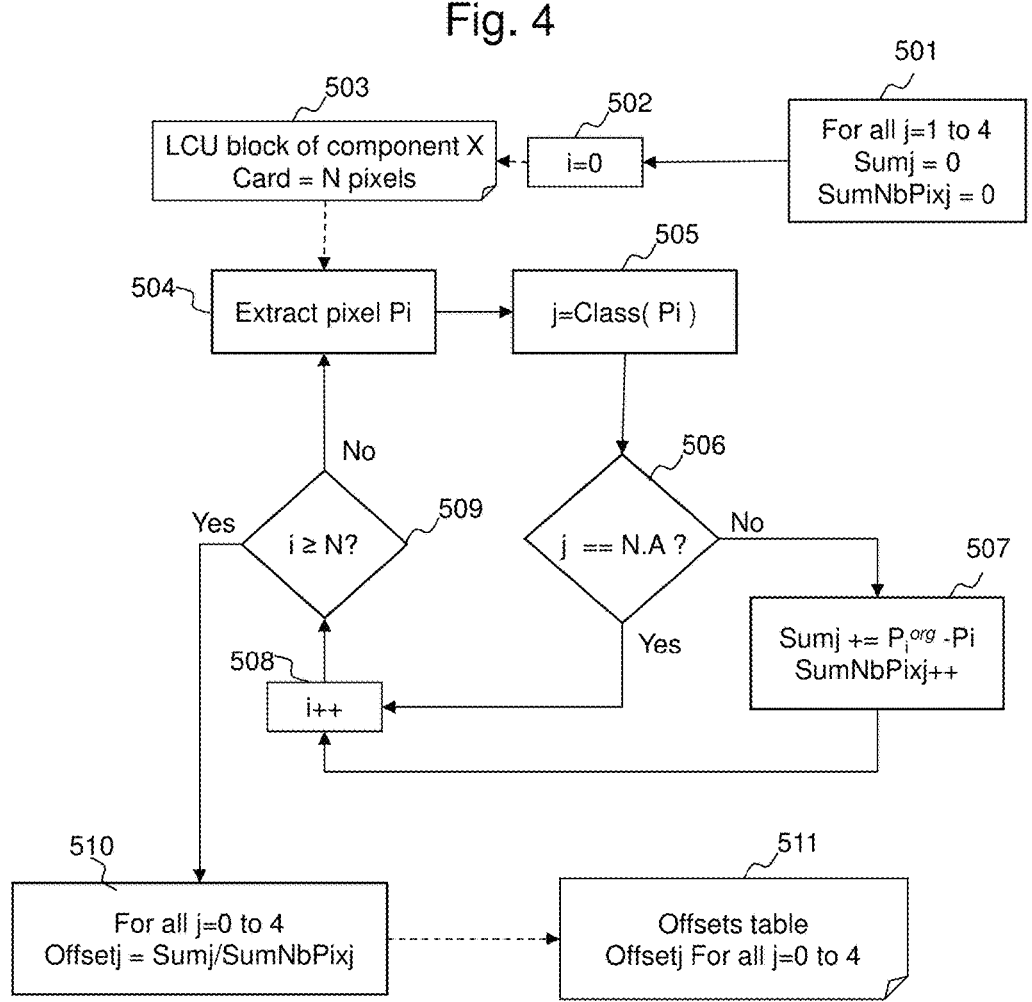
FIG. 5 is a flow chart illustrating steps of a process for determining compensation offsets for SAO Band offset of HEVC.

FIG. 5 is a flow chart illustrating steps of a method for selecting SAO offsets in an encoder for a current frame area 503 (typically an LCU block corresponding to one component of the processed image).

The frame area contains N pixels. In an initial step 501, variables $Sum_j$ and $SumNbPix_j$ are set to a value of zero for each of the four categories or ranges, j denotes the current range or category number. $Sum_j$ denotes the sum of the difference between the value of the pixels in the range/category j and the value of their corresponding original pixels. $SumNbPix_j$ denotes the number of pixels in the range j.

The description below is first made with reference to the Edge Offset mode when the direction has been selected (see FIGS. 3a and 3b). A similar approach can be used for the Band Offset mode as also described further below.

In step 502, the counter variable i is set to the value zero to process all the N pixels. Next, the first pixel Pi of the frame area 503 is extracted at step 504 and the category number j corresponding to the current pixel Pi is obtained at step 505. Next, a test is performed at step 506 to determine whether or not the category number j of the current pixel Pi corresponds to the value "N.A." as described above by reference to the table of FIG. 3b. If the category number j of the current pixel Pi corresponds to the value "N.A.", the value of counter variable i is incremented by one in order to classify subsequent pixels of the frame area 503. Otherwise, if the category number j of the current pixel Pi does not correspond to the value "N.A.", the $SumNbPix_j$ variable corresponding to the current pixel Pi is incremented by one and the difference between $P_i$ and its original value $P_i^{org}$ is added to $Sum_j$ in step 507.

At the following step 508, the counter variable i is incremented by one in order to apply the classification to the other pixels of the frame area 503. At step 509 it is determined whether or not all the N pixels of the frame area 503 have been processed (i.e. is i=N?), if yes, an $Offset_j$ for each category is computed at step 510 in order to produce an offset table 511 presenting an offset for each category j as the final result of the offset selection algorithm. This offset is computed as the average of the difference between the pixel values of the pixels of category j and their respective original pixel values. The $Offset_j$ for category j is given by the following equation:

$$Offset_j = \frac{Sum_j}{SumNbPix_j}$$

The computed offset $Offset_j$ can be considered as an optimal offset in terms of distortion. It is referred to as $Oopt_j$ in the following. From this offset, it is possible to determine an improved offset value $O\_RD_j$ according to a rate distortion criterion which will be offset $O_j$ of the table in FIG. 3b.

It is to be noted that such a set of four offsets $Oopt_j$ is obtained for each direction shown in FIG. 3a with a view of selecting the best direction according to a distortion criterion as explained above.

Figure 6:
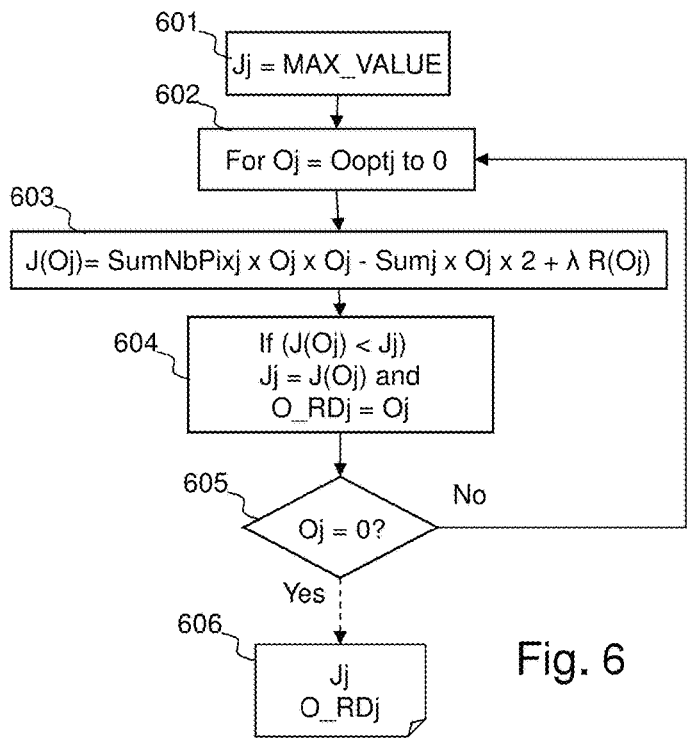
FIG. 6 is a flow chart illustrating a process to select an SAO offset from a rate-distortion point of view.

FIG. 6 is a flow chart illustrating steps of a method for determining an improved offset according to a rate distortion criterion starting from $Oopt_j$. This method is performed for each integer j belonging to [1; 4].

In an initial step 601, a rate distortion value $J_j$ of the current category number j is initialized to a predetermined maximum possible value (MAX_VALUE).

Next, a loop is launched at step 602 to make offset $O_j$ varying from $Oopt_j$ to zero. If value $Oopt_j$ is negative, variable $O_j$ is incremented by one until it reaches zero and if value $Oopt_j$ is positive, variable $O_j$ is decremented by one until it reaches zero, at each occurrence of step 602.

In step 603, the rate distortion cost related to variable $O_j$, denoted $J(O_j)$, is computed, for example according to the following formula:

$$J(O_j) = \text{SumNbPix}_j \times O_j \times O_j - \text{Sum}_j \times O_j \times 2 + \lambda R(O_j)$$

where $\lambda$ is the Lagrange parameter and $R(O_j)$ is a function which provides the number of bits needed to encode $O_j$ in the bitstream (i.e. the codeword associated with $O_j$). The part of the formula corresponding to $\text{SumNbPix}_j \times O_j \times O_j - \text{Sum}_j \times O_j \times 2$ relates to the improvement in terms of distortion given by the offset $O_j$.

In step 604, the values $J(O_j)$ and $J_j$ are compared with each other. If the value $J(O_j)$ is less than the value $J_j$, then $J_j$ is set to the value of $J(O_j)$ and $O\_RD_j$ is set to the value of $O_j$. Otherwise, the process directly goes to the next step 605.

In step 605, it is determined whether or not all the possible values of the offset $O_j$ have been processed (i.e. is $O_j=0$?). If offset $O_j$ is equal to zero, the loop is ended and an improved offset value $(O\_RD_j)$ for the category j has been identified with corresponding rate distortion cost Jj. Otherwise, the loop continues with the next $O_j$ value.

It is noted that the algorithm described by reference to FIG. 5 can be used to determine a position of a first range (sao_band_position) according to a Band offset classification type. To that end, index j represents a value of the interval [0, 32] (instead of [1, 4]). In other words, the value 4 is replaced by the value 32 in blocks 501, 510, and 511 of FIG. 5. In addition, "ranges" should be considered instead of "categories" in the explanations above.

More specifically, the difference $\text{Sum}_j$ between the value of the current pixel and its original value $P_i^{org}$ can be computed for each of the 32 classes represented in FIG. 4, that is to say for each range j (j belonging to the interval [0, 32]).

Next, an improved offset $O\_RD_j$, in terms of rate distortion is computed for the 32 ranges according to an algorithm similar to the one described above with reference to FIG. 6.

Figure 7:
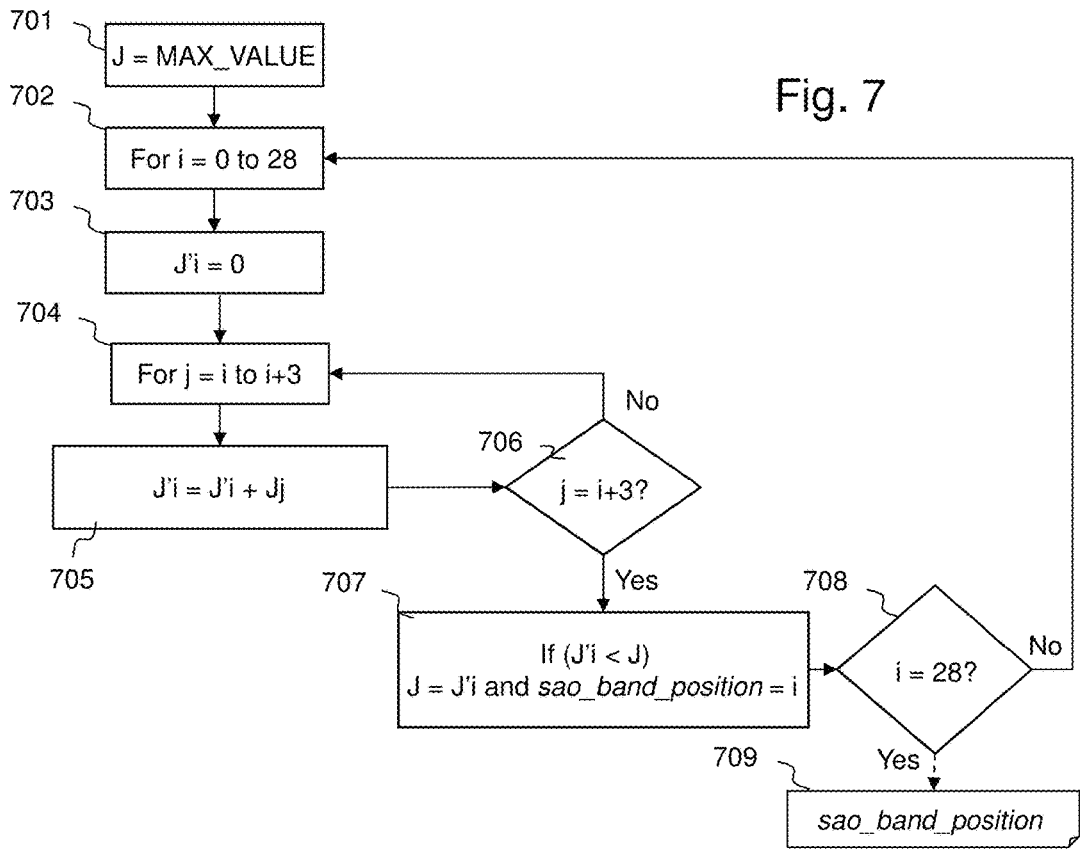
FIG. 7 is a flow chart illustrating steps of a method for determining an SAO band position for SAO Band offset of HEVC.

Next, the position of the first class is determined as described now with reference to FIG. 7.

FIG. 7 is a flow chart illustrating steps of a method for determining an SAO band position for SAO Band offset of HEVC. Since these steps are carried out after the process described above with reference to FIG. 6, the rate distortion value denoted $J_j$ has already been computed for each range j.

In an initial step 701, the rate distortion value J is initialized to a predetermined maximum possible value (MAX_VALUE). Next, a loop is launched at step 702 to make index i varying from zero to 28, corresponding to the 29 possible positions of the first class of the group of four consecutive classes within the 32 ranges of pixel values.

In step 703, the variable corresponding to the rate distortion value of the current band, that is to say the band comprising four consecutive classes from the range having the index i, is initialized to zero. Next, a loop is launched at step 704 to make index j vary from i to i+3, corresponding to the four classes of the band currently considered.

Next, in step 705, the value of the variable $J'_i$ is incremented by the value of the rate distortion value of the class having index j (i.e. by $J_j$ as computed above). This step is repeated for the four classes of the band currently considered, that is to say until index j reaches i+3 (step 706).

In step 707, a test is performed to determine whether or not the rate distortion value $J'_j$ of the band currently considered is less than the rate distortion value J. If the rate distortion value $J'_j$ of the band currently considered is less than the rate distortion value J, the rate distortion value J is set to the value of the rate distortion of the band currently considered and the band position value denoted sao_band_position is set to the value of the index i, meaning that the band currently considered is currently the best band from amongst all the bands already processed.

These steps are repeated for the 29 possible positions of the first class of the group of four consecutive classes (step 708) to determine the band position (sao_band_position) to be used.

Using the above-described mechanisms, the distortion or rate distortion values for each direction of the Edge Offset mode and for the Band Offset mode have been computed for the same frame area, e.g. LCU. Then, they are compared with each other in order to determine the best one (lowest (rate) distortion value) which is then selected as the SAO filtering mode (sao_type_idx together with sao_eo_class or sao_band_position) for the current frame area.

The SAO parameters, i.e. the SAO type parameter sao_type_idx and, if any, the SAO-type-depending sub-parameter sao_eo_class or sao_band_position and the four offset values are added to the bitstream for each frame area (LCU). The code word to represent each of these syntax elements can use a fixed length code or any method of arithmetic coding.

A particular embodiment of SAO filtering makes it possible to copy SAO parameters for a given LCU from the "up" or "left" LCU, thereby enabling the SAO parameters not to be transmitted.

In order to avoid encoding one set of SAO parameters per LCU (which is very costly), a predictive scheme is used in this embodiment. The predictive mode for SAO parameters consists in checking whether the LCU on the left of the current LCU uses the same SAO parameters or not. In the negative, a second check is performed with the LCU above the current LCU, still checking whether the above LCU uses the same SAO parameters or not.

In the positive of any of the two checks, the SAO parameters as computed above are not added to the bitstream, but a particular flag is enabled, e.g. flag sao_merge_left_flag is set to true or "1" when the first check is positive or flag sao_merge_up_flag is set to true or "1" when the second check is positive.

This predictive technique makes it possible for the amount of data to represent the SAO parameters for the LCU mode in the bitstream to be reduced.

Figure 8:
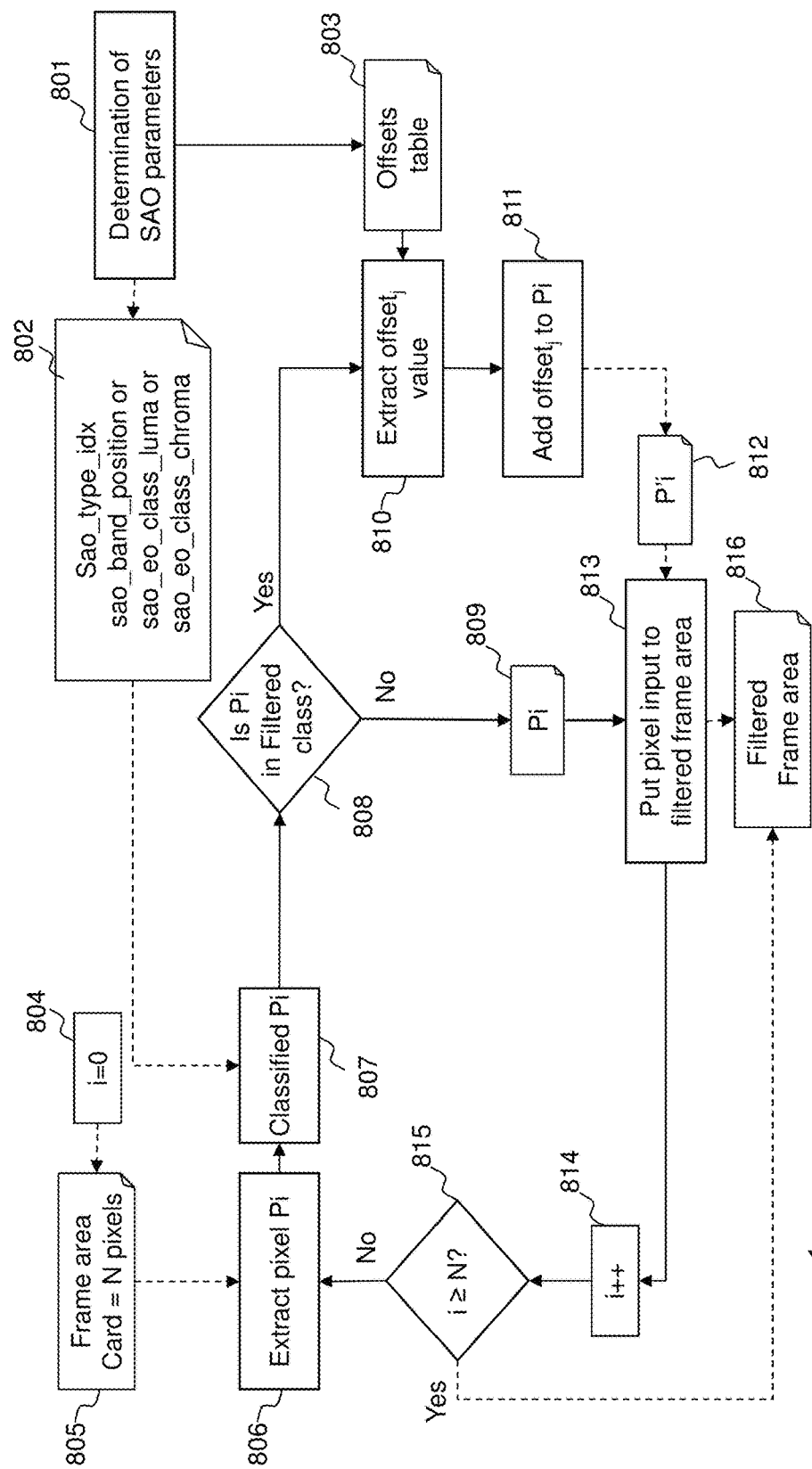
FIG. 8 is a flow chart illustrating steps of a method for filtering a frame area according to an SAO loop filter.

FIG. 8 is a flow chart illustrating steps of a method for filtering a frame area, typically an LCU block corresponding to one component of a processed frame, according to an SAO loop filter.

Such an algorithm is generally implemented in a decoding loop of the decoder to decode frames and of the encoder to generate reference frames that are used for motion estimation and compensation of following frames.

In an initial step 801, SAO filtering parameters are obtained, for example from a received bitstream (decoder) or from the prepared bitstream (encoder) or calculated locally as explained below. For a given frame area, these parameters typically comprise four offsets that can be stored in table 803 and the SAO type parameter sao_type_idx. Depending on the latter, the SAO parameters may further comprise the sao_band_position parameter or the sao_eo_class parameter (802). It is to be noted that a given value of a given SAO parameter, such as the value zero for the sao_type_idx parameter may indicate that no SAO filtering is applied.

Figure 9:
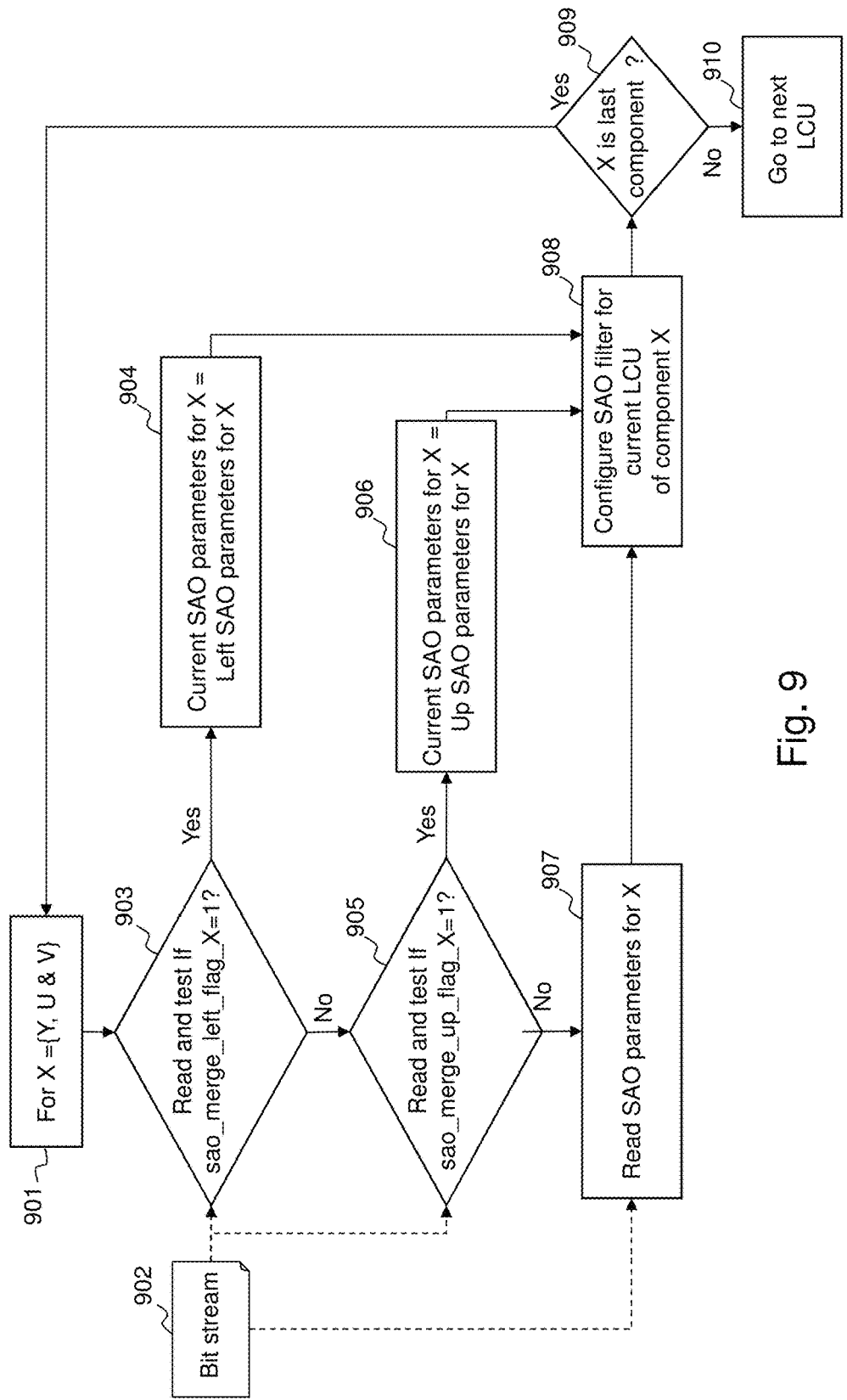
FIG. 9 is a flow chart illustrating steps of a method for reading SAO parameters from a bitstream.
Figure 10:
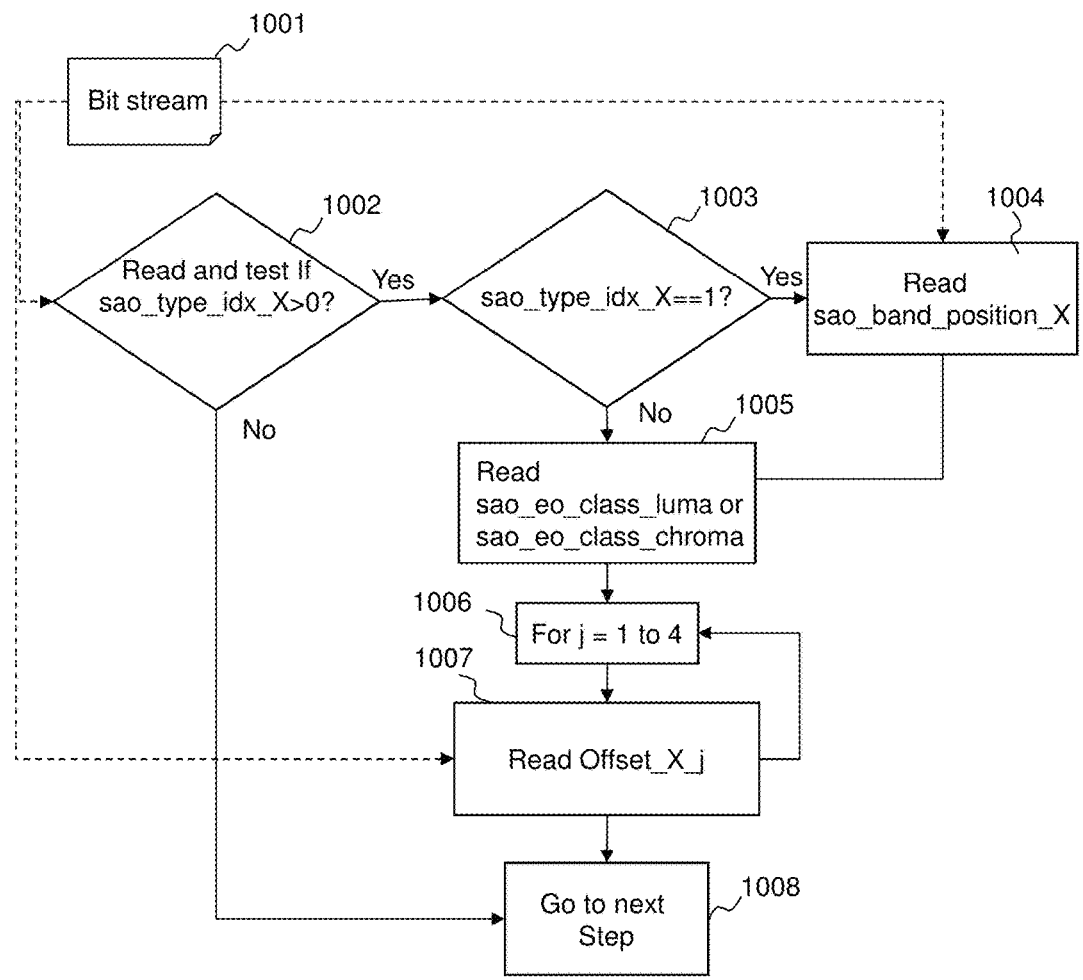
FIG. 10 is a flow chart illustrating steps of a method for reading SAO parameter syntax from a bitstream.

FIGS. 9 and 10 illustrate the initial step 801 of obtaining the SAO parameters from the bitstream.

FIG. 9 is a flow chart illustrating steps of a method for reading SAO parameters from a bitstream.

In step 901, the process starts by selecting a color component of the video sequence. In the current version of HEVC, the parameters are selected for the luma component Y and for both U and V components (together).

In the example of a YUV sequence, the process starts with the Y component.

In step 903, the sao_merge_left_flag is read from the bitstream 902 and decoded. If its value is true or "1", the next step is 904 where the SAO parameters of left LCU are copied for the current LCU. This enables to determine the type of the SAO filter (sao_type_idx) for the current LCU and its configuration (offsets and sao_eo_class or sao_band_position).

If the answer is negative at 903 then the sao_merge_up_flag is read from the bitstream 902 and decoded. If its value is true or "1", the next step is 905 where the SAO parameters of above LCU are copied for the current LCU. This enables to determine the type of the SAO filter (sao_type_idx) for the current LCU and its configuration (offsets and sao_eo_class or sao_band_position).

If the answer is negative at step 905, that means that the SAO parameters for the current LCU are not predicted from left or above LCU. They are then read and decoded from the bitstream 902 at step 907 as described below with reference to FIG. 10.

The SAO parameters being known for the current LCU, a SAO filter is configured accordingly at step 908.

The next step is 909 where a check is performed to know if the three color components (Y and U&V) for the current LCU have been processed.

If the answer is positive, the determination of the SAO parameters for the three components is completed and the next LCU can be processed through step 910. Otherwise, only Y has been processed, and U and V are now processed together by going back to step 901.

The parsing and reading 907 of the SAO parameters from the bitstream 902 is now described with reference to FIG. 10.

The process starts at step 1002 by the reading from the bitstream 1001 and decoding of the sao_type_idx syntax element. This makes it possible to know the type of SAO filter to apply to the LCU (frame area) for the color component Y (sao_type_idx_Y) or Chroma U & V (sao_type_idx_UV).

For example, for a YUV 4:2:0 video sequence, two components are considered: one for Y, and one for U and V. Each sao_type_idx_X can take three values as already shown in Table 1 above: 0 correspond to no SAO, 1 corresponds to the Band Offset SAO type and 2 corresponds to the Edge Offset SAO type.

Step 1002 also checks whether the considered sao_type_idx is strictly positive or not.

If sao_type_idx is equal to "0" (which means that there is no SAO for this frame area), the obtaining of the SAO parameters from the bitstream 1001 has been completed and the next step is 1008.

Otherwise (sao_typ_idx is strictly positive) SAO parameters exist for the current LCU in the bitstream 1001. Step 1003 thus tests whether the type of SAO filter corresponds to the Band Offset type (sao_type_idx==1).

If it is, the next step 1004 is performed in order to read the bitstream for retrieving the position of the SAO band (sao_band_position) as illustrated in FIG. 4.

If the answer is negative at step 1003 (sao_type_idx is set equal to 2), the SAO filter type is the Edge Offset mode, in which case, at step 1005, the Edge Offset class or direction (sao_eo_class) is retrieved from the bitstream 1001.

If X is equal to Y, the read syntax element is sao_eo_class_luma. If X is set equal to UV, the read syntax element is sao_eo_class_chroma.

Following step 1004 or 1005, step 1006 drives a loop of four iterations (j=1 to 4). Each iteration consists in step 1007 where the offset $O_j$ with index j is read and decoded from the bitstream 1001. The four offsets obtained correspond either to the four offsets of one of the four classes of SAO Edge Offset or to the four offsets related to the four ranges of the SAO Band Offset. When the four offsets have been decoded, the reading of the SAO parameters has been completed and the next step is 1008 ending the process.

In some embodiments of the invention, SAO parameters are not transmitted in the bitstream because they can be determined by the decoder in the same way as done at the encoder. In this context, local determination of SAO parameters at the decoder should be considered instead of retrieving those parameters from the bitstream.

Back to FIG. 8 where the SAO parameters 802 and 803 have been obtained, the process performs step 804 during which a counter variable i is set to the value zero to process all pixels of the current frame area.

Next, the first pixel $P_i$ of the current frame area 805, comprising N pixels, is obtained at step 806 (as shown in FIG. 1 or 2, it is the result of an internal decoding of a previously encoded frame area) and classified at step 807 according to the SAO parameters 802 read and decoded from the bitstream or obtained locally, i.e. Edge Offset classification or Band Offset classification as described previously.

Next, at step 808, a test is performed to determine whether or not pixel $P_i$ belongs to a valid class, i.e. a class of pixels to be filtered. This is the case if sao_type_idx is 1 or 2 in the above example.

If pixel $P_j$ belongs to a class of pixels to be filtered, its related class number and possible category j are identified (i.e. direction and category in the Edge Offset mode, or start of first class and class in the Band Offset mode) and its related offset value $Offset_j$ is obtained at step 810 from the offsets table 803.

Next, at step 811, $Offset_j$ is added to the value of pixel $P_i$ in order to produce a new pixel value referred to as $P'_i$ (812) which is a filtered pixel. In step 813, pixel $P'_i$ replaces pixel Pi in the processed frame area 816.

Otherwise, if pixel $P_i$ does not belong to a class of pixels to be filtered, pixel $P_i$ 809 remains unchanged in the frame area at step 813.

Next, after having processed pixel $P_i$, the counter variable i is incremented by one at step 814 in order to apply the filter in the same way as the next pixel of the current frame area 805.

Step 815 determines whether or not all the N pixels of the current frame area 805 have been processed (i≥N). If yes, the processed frame area 816 has been reconstructed as stored in 813, and can be added to the SAO reconstructed frame (104 in FIG. 1 or 208 in FIG. 2) as a subpart thereof.

Figure 11A:
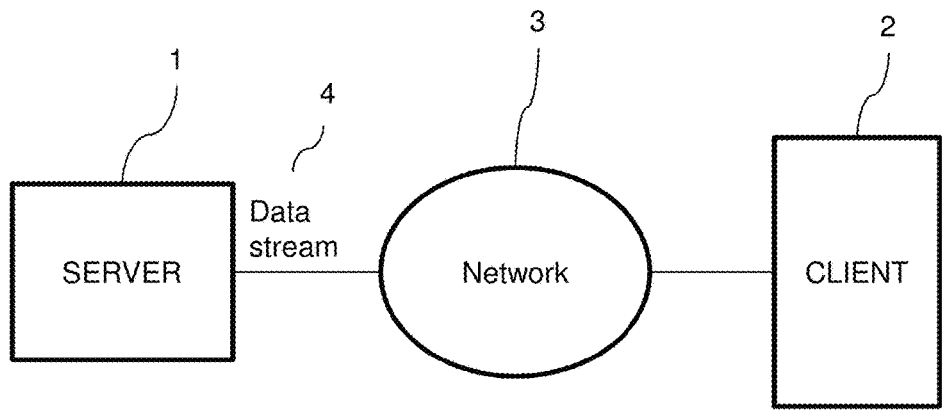
FIG. 11A schematically illustrates a data communication system in which one or more embodiments of the invention may be implemented.

FIG. 11A illustrates a data communication system in which one or more embodiments of the invention may be implemented. The data communication system comprises a sending device, in this case a server 1, which is operable to transmit data packets of a data stream to a receiving device, in this case a client terminal 2, via a data communication network 3. The data communication network 3 may be a Wide Area Network (WAN) or a Local Area Network (LAN). Such a network may be for example a wireless network (Wifi/802.11a or b or g or n), an Ethernet network, an Internet network or a mixed network composed of several different networks. In a particular embodiment of the invention the data communication system may be, for example, a digital television broadcast system in which the server 1 sends the same data content to multiple clients.

The data stream 4 provided by the server 1 may be composed of multimedia data representing video and audio data. Audio and video data streams may, in some embodiments, be captured by the server 1 using a microphone and a camera respectively. In some embodiments data streams may be stored on the server 1 or received by the server 1 from another data provider. The video and audio streams are coded by an encoder of the server 1 in particular for them to be compressed for transmission.

In order to obtain a better ratio of the quality of transmitted data to quantity of transmitted data, the compression of the video data may be of motion compensation type, for example in accordance with the HEVC type format or H.264/AVC type format and including features of the invention as described below.

A decoder of the client 2 decodes the reconstructed data stream received by the network 3. The reconstructed images may be displayed by a display device and received audio data may be reproduced by a loud speaker. Reflecting the encoding, the decoding also includes features of the invention as described below.

Figure 11B:
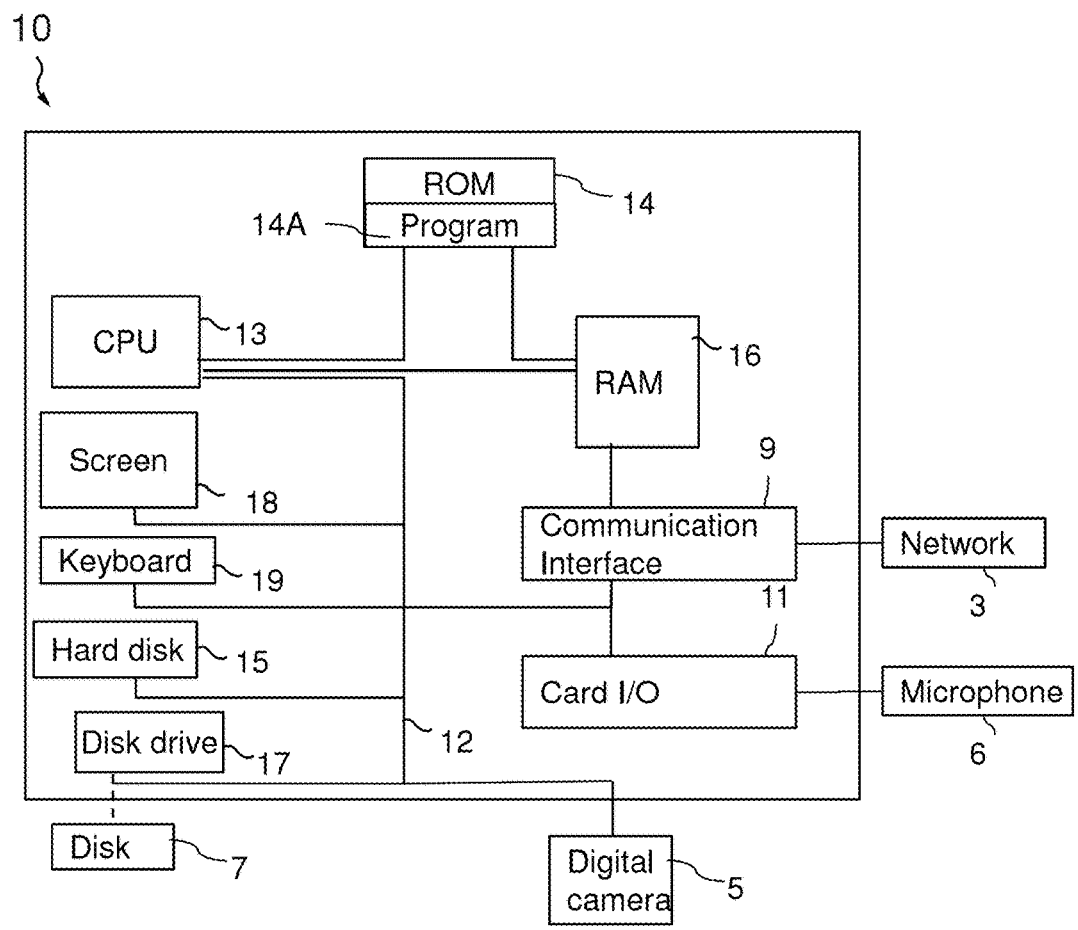
FIG. 11B illustrates an example of a device for encoding or decoding images, capable of implementing one or more embodiments of the present invention.

FIG. 11B shows a device 10, in which one or more embodiments of the invention may be implemented, illustrated arranged in cooperation with a digital camera 5, a microphone 6 (shown via a card input/output 11), a telecommunications network 3 and a disc 7, comprising a communication bus 12 to which are connected:

- a central processing CPU 13, for example provided in the form of a microprocessor
- a read only memory (ROM) 14 comprising a program 14A whose execution enables the methods according to an embodiment of the invention. This memory 14 may be a flash memory or EEPROM;
- a random access memory (RAM) 16 which, after powering up of the device 10, contains the executable code of the program 14A necessary for the implementation of an embodiment of the invention. This RAM memory 16, being random access type, provides fast access compared to ROM 14. In addition the RAM 16 stores the various images and the various blocks of pixels as the processing is carried out on the video sequences (transform, quantization, storage of reference images etc.);
- a screen 18 for displaying data, in particular video and/or serving as a graphical interface with the user, who may thus interact with the programs according to an embodiment of the invention, using a keyboard 19 or any other means e.g. a mouse (not shown) or pointing device (not shown);
- a hard disc 15 or a storage memory, such as a memory of compact flash type, able to contain the programs of an embodiment of the invention as well as data used or produced on implementation of an embodiment of the invention;
- an optional disc drive 17, or another reader for a removable data carrier, adapted to receive a disc 7 and to read/write thereon data processed, or to be processed, in accordance with an embodiment of the invention and;
- a communication interface 9 connected to a telecommunications network 34
- connection to a digital camera 5

The communication bus 12 permits communication and interoperability between the different elements included in the device 10 or connected to it. The representation of the communication bus 12 given here is not limiting. In particular, the CPU 13 may communicate instructions to any element of the device 10 directly or by means of another element of the device 10.

The disc 7 can be replaced by any information carrier such as a compact disc (CD-ROM), either writable or rewritable, a ZIP disc or a memory card. Generally, an information storage means, which can be read by a micro-computer or microprocessor, which may optionally be integrated in the device 10 for processing a video sequence, is adapted to store one or more programs whose execution permits the implementation of the method according to an embodiment of the invention.

The executable code enabling the coding device to implement an embodiment of the invention may be stored in ROM 14, on the hard disc 15 or on a removable digital medium such as a disc 7.

The CPU 13 controls and directs the execution of the instructions or portions of software code of the program or programs of an embodiment of the invention, the instructions or portions of software code being stored in one of the aforementioned storage means. On powering up of the device 10, the program or programs stored in non-volatile memory, e.g. hard disc 15 or ROM 14, are transferred into the RAM 16, which then contains the executable code of the program or programs of an embodiment of the invention, as well as registers for storing the variables and parameters necessary for implementation of an embodiment of the invention.

It should be noted that the device implementing an embodiment of the invention, or incorporating it, may be implemented in the form of a programmed apparatus. For example, such a device may then contain the code of the computer program or programs in a fixed form in an application specific integrated circuit (ASIC).

The device 10 described here and, particularly, the CPU 13, may implement all or part of the processing operations described below.

Figure 12:
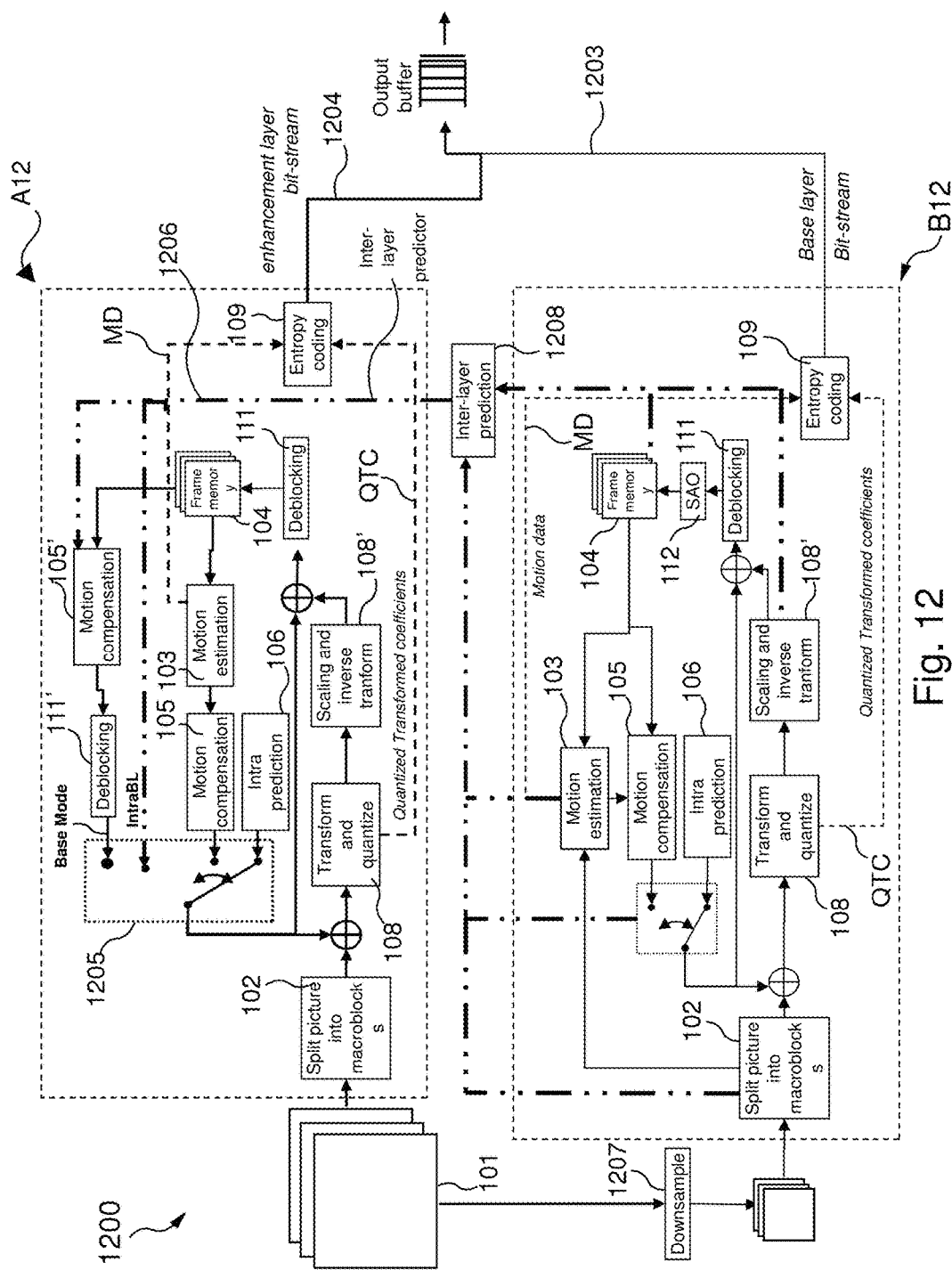
FIG. 12 illustrates a block diagram of a scalable video encoder according to embodiments of the invention, compliant with the HEVC standard in the compression of the base layer.

FIG. 12 illustrates a block diagram of a scalable video encoder 1200, which comprises a straightforward extension of the standard video coder of FIG. 1, towards a scalable video coder. Embodiments of the invention may be implemented in such a scalable video encoder.

This video encoder may comprise a number of subparts or stages, illustrated here are two subparts or stages A12 and B12 producing data corresponding to a base layer 1203 and data corresponding to one enhancement layer 1204. Additional subparts A12 may be contemplated in case other enhancement layers are defined in the scalable coding scheme. Each of the subparts A12 and B12 follows the principles of the video encoder 100, with the steps of transformation, quantization and entropy coding being applied in two separate paths, one corresponding to each layer.

The first stage B12 aims at encoding the H.264/AVC or HEVC compliant base layer of the output scalable stream, and hence is identical to the encoder of FIG. 1. Next, the second stage A12 illustrates the coding of an enhancement layer on top of the base layer. This enhancement layer brings a refinement of the spatial resolution to the (down-sampled 1207) base layer.

As illustrated in FIG. 12, the coding scheme of this enhancement layer is similar to that of the base layer, except that for each block or coding unit of a current frame 101 being compressed or coded, additional prediction modes can be chosen by the coding mode selection module 1205.

The additional prediction and coding modes implement inter-layer prediction 1208. Inter-layer prediction 1208 consists in re-using data coded in a layer lower than current refinement or enhancement layer (e.g. base layer), as prediction data of the current coding unit.

The lower layer used is called the reference layer for the inter-layer prediction of the current enhancement layer. In case the reference layer contains a frame that temporally coincides with the current enhancement frame to encode, then it is called the base frame of the current enhancement frame. As described below, the co-located block (at same spatial position) of the current coding unit that has been coded in the reference layer can be used to provide data in view of building or selecting a prediction unit or block to predict the current coding unit. More precisely, the prediction data that can be used from the co-located block includes the coding mode, the block partition or break-down, the motion data (if present) and the texture data (temporal residual or reconstructed block) of that co-located block. In case of spatial scalability between the enhancement layer and the base layer, some up-sampling operations of the texture and prediction data are performed.

As described above, in the decoding loop of the subpart B12, SAO post-filtering 112 (and optionally deblocking 111) is provided to the decoded frame (LCU by LCU) to generate filtered base frames 104 used as reference frames for future prediction. SAO parameters are thus produced at the base layer B12 as explained above with reference to FIGS. 3 to 7 and/or using the present invention, and are added to the base layer bit-stream 1203 for the decoder.

Figure 13:
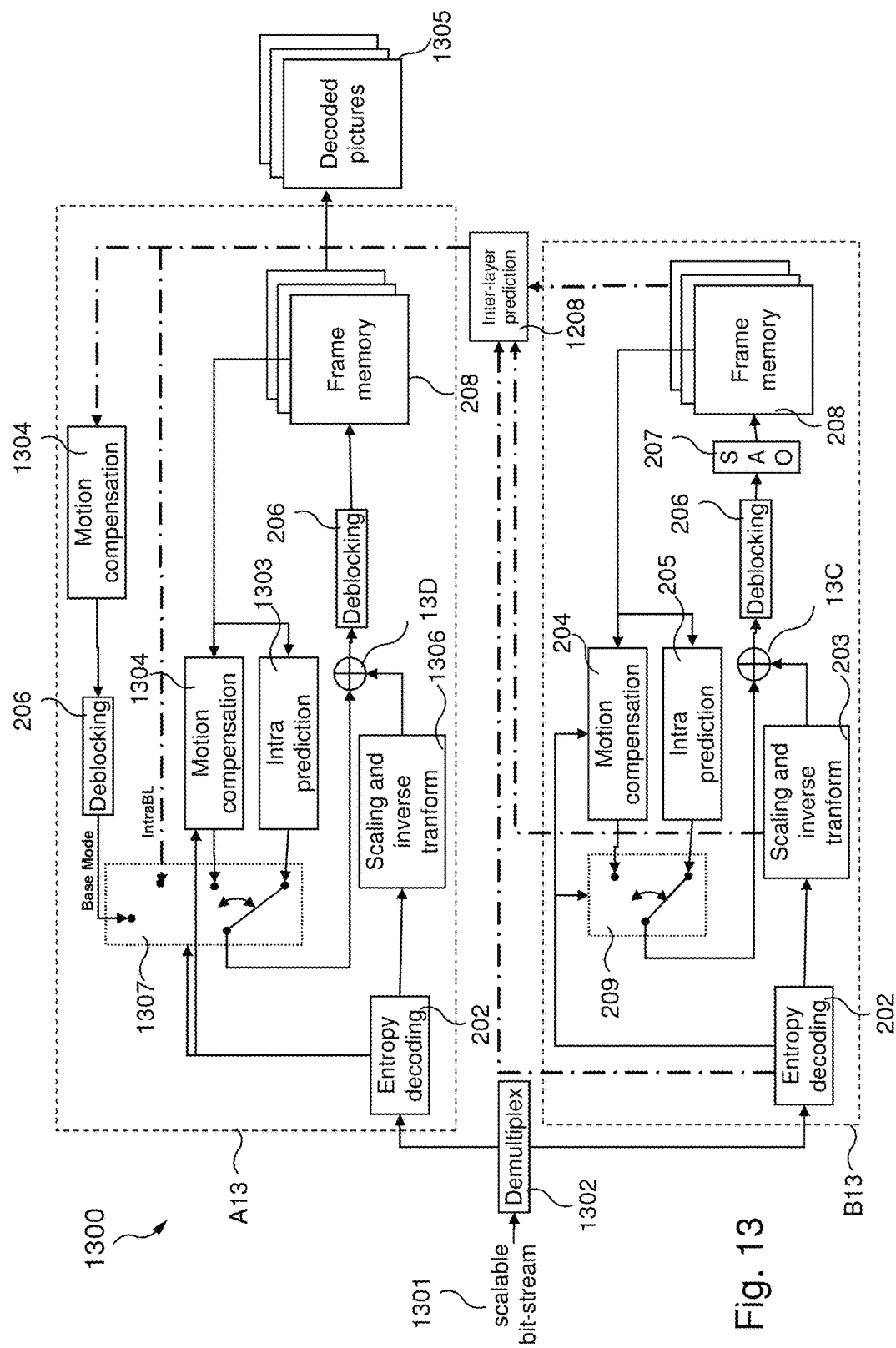
FIG. 13 illustrates a block diagram of a scalable decoder according to embodiments of the invention, compliant with standard HEVC or H.264/AVC in the decoding of the base layer, and reciprocal to the encoder of FIG. 12.

FIG. 13 presents a block diagram of a scalable video decoder 1300 which would apply on a scalable bit-stream made of two scalability layers, e.g. comprising a base layer and an enhancement layer, for example the bit-stream generated by the scalable video encoder of FIG. 12. This decoding process is thus the reciprocal processing of the scalable coding process of the same Figure. The scalable bit-stream being decoded 1301, as shown in FIG. 13 is made of one base layer and one spatial enhancement layer on top of the base layer, which are demultiplexed 1302 into their respective layers.

The first stage of FIG. 13 concerns the base layer decoding process B13. As previously explained for the non-scalable case, this decoding process starts by entropy decoding 202 each coding unit or block of each coded image in the base layer from the base layer bitstream (1203 in FIG. 12). This entropy decoding 202 provides the coding mode, the motion data (reference image indexes, motion vectors of Inter coded macroblocks) and residual data. This residual data consists of quantized and transformed DCT coefficients. Next, these quantized DCT coefficients undergo inverse quantization and inverse transform operations 203. Motion compensation 204 or Intra prediction 205 data can be added 13C.

Deblocking 206 and SAO filtering 207 are performed on the decoded data (LCU by LCU), in particular by reading SAO parameters from the bitstream 1301 as explained above with reference to FIGS. 8 to 10 and/or by determining some SAO parameters locally. The so-reconstructed residual data is then stored in the frame buffer 208.

Next, the decoded motion and temporal residual for Inter blocks, and the reconstructed blocks are stored into a frame buffer in the first stage B13 of the scalable decoder of FIG. 13. Such frames contain the data that can be used as reference data to predict an upper scalability layer.

Next, the second stage A13 of FIG. 13 performs the decoding of a spatial enhancement layer A13 on top of the base layer decoded by the first stage. This spatial enhancement layer decoding involves the entropy decoding of the second layer 202 from the enhancement layer bitstream (1204 in FIG. 12), which provides the coding modes, motion information as well as the transformed and quantized residual information of blocks of the second layer.

Next step consists in predicting blocks in the enhancement image. The choice 1307 between different types of block prediction modes (those suggested above with reference to the encoder of FIG. 12—conventional INTRA coding mode, conventional INTER coding mode or Inter-layer coding modes) depends on the prediction mode obtained through the entropy decoding step 202 from the bitstream 1301.

The result of the entropy decoding 202 undergoes inverse quantization and inverse transform 1306, and then is added 13D to the obtained prediction block. The obtained block is optionally post-processed 206 (if the same has occurred in A12 at the encoder level) to produce the decoded enhancement image that can be displayed and are stored in reference frame memory 208.

Figure 14:
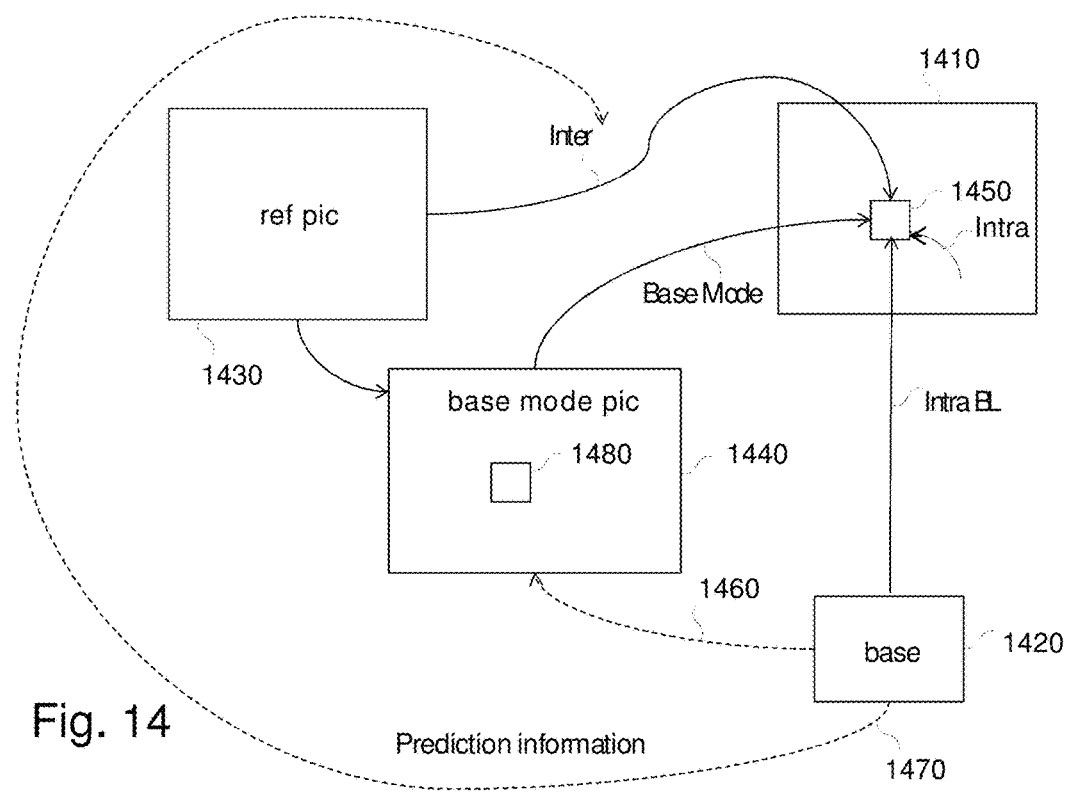
FIG. 14 schematically illustrates Inter-layer prediction modes that can be used in the proposed scalable codec architecture.

FIG. 14 schematically illustrates Inter-layer prediction modes that can be used in the proposed scalable codec architecture, according to an embodiment, for prediction of a current enhancement image.

Schematic 1410 corresponds to the current enhancement frame to be predicted. The base frame 1420 corresponds to the base layer decoded image that temporally coincides with the current enhancement frame.

Schematic 1430 corresponds to an exemplary reference frame in the enhancement layer used for the conventional temporal prediction of the current enhancement frame 1410.

Schematic 1440 corresponds to a Base Mode prediction image as further described below.

As illustrated by FIG. 14, the prediction of current enhancement frame 1410 comprises determining, for each block 1450 in current enhancement frame 1410, the best available prediction mode for that block 1450, considering prediction modes including spatial prediction (INTRA), temporal prediction (INTER), Intra BL prediction and Base Mode prediction.

Briefly, the Intra BL (Base Layer) prediction mode consists in predicting a coding unit or block 1450 of the enhancement frame 1410 using its co-located decoded frame area (in an up-sampled version in case of spatial scalability) taken from the decoded base frame 1420 that temporally coincides with frame 1410. Intra BL mode is known from SVC (Scalable Video Coding).

In practice, to avoid complexity in processing the data (in particular to avoid storing large amount of data at the decoder), the up-sampled version of the decoded base frame 1420 is not fully reconstructed at the decoder. Only the blocks of 1420 that are necessary as predictors for decoding are reconstructed.

The Base Mode prediction mode consists in predicting a block of the enhancement frame 1410 from its co-located block 1480 in the Base Mode prediction image 1440, constructed both on the encoder and decoder sides using data and prediction data from the base layer.

The base mode prediction image 1440 is composed of base mode blocks obtained using prediction information 1460 derived from prediction information of the base layer.

In more details, for each base mode block forming the base mode prediction image, the co-located base block in the corresponding base frame 1420 is considered.

If that co-located base block is intra coded, the base mode block directly derives from the co-located base block, for example by copying that co-located base block, possibly up-sampled in case of spatial scalability between the base layer and the enhancement layer.

If the co-located base block is inter coded into a base residual using prediction information in the base layer, the base mode block derives from a prediction block of reference frame 1430 in the enhancement layer and from a decoded version (up-sampled in case of spatial scalability) of the base residual, which prediction block is obtained by applying a motion vector (up-sampled in case of spatial scalability) of the prediction information to the base mode block. The prediction block and the decoded base residual are for example added one to the other.

In practice, to avoid complexity in processing the data (in particular to avoid storing large amount of data at the decoder), the base mode prediction image 1440 is not fully reconstructed at the decoder. Only the base mode blocks that are necessary as predictors for decoding are reconstructed.

One can note also that in another implementation of the base mode prediction mode, no base mode prediction image is constructed at the encoder. The base mode predictor of a current block in the enhancement layer is constructed just by using the motion information of the co-located frame area in the base layer frame. The so constructed base mode predictor can be enhanced by predicting the current block residual from the residual of the co-located block in the base layer.

A deblocking 206 of the base mode prediction image 1440 is optionally implemented before the base mode prediction image is used to provide prediction blocks for frame 1410.

Given these two additional Inter-layer coding modes (one is Intra coding, the other involves temporal reference frames), addition step 13D at the enhancement layer for current block 1450 consists in adding the reconstructed residual for that block (after step 1306) with:

- a spatial predictor block taken from current enhancement frame 1410 in case of conventional INTRA prediction;
- an upsampled decoded base block taken from base frame 1420 and co-located with block 1450, in case of Intra BL prediction;
- a temporal predictor block taken from a reference enhancement frame 1430 (from frame memory 208 in A13) in case of conventional INTER prediction; or
- a base mode block 1480 co-located with block 1450 in the base mode prediction image, in case of Base Mode prediction.

These are only two examples of Inter-layer coding modes. Other Inter-layer coding modes may be implemented using the same and/or other information from the base layer. For example, the base layer prediction information may be used in the predictive coding 1470 of motion vectors in the enhancement layer. Therefore, the INTER prediction mode may make use of the prediction information contained in the base image 1420. This would allow inter-layer prediction of the motion vectors of the enhancement layer, hence increasing the coding efficiency of the scalable video coding system.

The present invention regards the determination of SAO parameters that is independent of the sample or pixel values of the frame area subjected to SAO filtering. That means that the pixels values of the current frame area before or after applying SAO filtering are not taken into account to apply said SAO filtering.

Thanks to the independent determination of SAO parameters, the SAO filtering proves to be less complex. This is because computation based on pixel values is usually complex due to the number of pixels within the frame area considered.

Deliberately, no SAO filtering block has been shown in FIGS. 12 and 13. This is because the SAO filtering of a frame, or more generally of a frame area (e.g. LCU), according to the invention may be implemented at various locations (listed below) in the decoding loop of the encoder or decoder (i.e. to different frames in course of processing a current enhancement layer). In other words, various frames processed in the decoding loop may act as the frame to which the SAO filtering according to the invention is applied.

In the locations listed below where the SAO filtering according to the invention would not be performed, a conventional SAO can optionally be implemented. In some embodiments, the conventional SAO filtering can be combined (e.g. one after the other) with the SAO filtering according to the invention, at the same location in the process.

The embodiments below can be combined (i.e. at several locations when processing the same frame) to provide several SAO filtering according to the invention in the same enhancement layer. However, to avoid substantial increase in complexity, the number of SAO filtering implemented in the process may be restricted (in one or several locations) during the processing of a current enhancement frame area. For example, several SAO filterings according to the invention may be cascaded on the same frame area.

In one embodiment, the SAO filtering using pixel-independent SAO parameters is applied to the up-sampled decoded base layer in order to filter this base frame before it is used in the Inter-layer coding modes.

The filtered up-sampled base frame is used for example in the Intra BL coding mode but also in a Differential mode Inter layer (Diff mode) coding mode according to which the difference (or residual) between this up-sampled base frame and the original frame 101 is input to subpart A12 (instead of the original frame 101, thus requiring slight modifications in the Figures to offer coding/decoding of residuals only).

This embodiment corresponds to providing the SAO filtering in block 1208 of FIGS. 12 and 13, just before providing the up-sampled decoded base frame 1420 to the subpart A12/A13.

In another embodiment, the SAO filtering using pixel-independent SAO parameters is applied on the Diff mode frame as defined above, i.e. on the residual (or difference) input to subpart A12 in the Diff mode.

This particular case applies the SAO filtering according to the invention to residual pixel values and not to reconstructed pixel values, as in the other embodiments.

In yet another embodiment, the SAO filtering using pixel-independent SAO parameters is applied to the Base Mode prediction image 1440 (or to base mode blocks that are reconstructed if the full image 1440 is not reconstructed).

This embodiment corresponds to providing the SAO filtering just after deblocking 111' in A12 and deblocking 206 in A13 for the Base Mode prediction, of FIGS. 12 and 13. As the deblocking is optional, the SAO filtering according to the invention may then be provided in replacement of these two blocks 111' and 206 shown in the Figures.

In yet another embodiment, the SAO filtering using pixel-independent SAO parameters is applied to the encoded/decoded base frame at the base layer level. In particular this SAO filtering according to the invention is in addition to the SAO post-filtering already provided in the base layer but is only used to generate a reconstructed base frame to the enhancement layer (e.g. to generate the Intra BL predictor or the Base Mode prediction frame or the Diff mode residual frame). In other words, the reconstructed base frame provided as an output of the base layer to the frame memory 108/204 (storing the reference base frames) does not undergo this SAO filtering according to the invention.

This embodiment offers complexity reduction for spatial scalability compared to when the SAO filtering according to the invention is applied on the upsampled reconstructed base frame.

In yet another embodiment, the SAO filtering using pixel-independent SAO parameters is applied to the reference frame pictures or blocks thereof stored in 104 or 208 of the enhancement layer modules A12, A13, just before they are used in motion estimation and compensation.

In yet another embodiment, the SAO filtering using pixel-independent SAO parameters is applied as a post-filtering to the reconstructed enhancement frames (i.e. to the encoded/decoded enhancement frame), just before they are stored in the frame memory 104 or 208 of the enhancement layer modules A12, A13.

This embodiment corresponds to providing the SAO filtering just after (or in replacement of) deblocking 111 in A12 and deblocking 206 in A13 after adding (13D) the predictor with the reconstructed residual, of FIGS. 12 and 13. This is a symmetrical position to the SAO already providing at the base layer.

In yet another embodiment, the SAO filtering using pixel-independent SAO parameters is applied as a post-filtering to the reconstructed base frames just before they are stored in the frame memory 109 or 208 of the base layer or to the reconstructed frames of a non-scalable video coder/decoder (i.e. at blocks 112 and 207 of FIGS. 1 and 2).

In any of these embodiments, the SAO filtering according to the invention can compete with a conventional SAO filtering, for example depending on which depth the frame considered belongs to, according to a temporal prediction hierarchy.

According to the invention, at least one of the SAO parameters for these embodiments is determined independently of the sample values of the frame area considered.

The use of pixel-independent SAO parameters according to the invention can be systematic for all the LCUs of the frame area (e.g. slice, the whole frame) or even of several frames. In that situation, the same pixel-independent SAO parameter(s) is applied with the SAO filtering to each of these LCUs. This does not exclude that some other SAO parameters (be pixel-independent or not) can change from time to time, e.g. from one LCU to the other.

For the purpose of illustration, an Edge Offset filtering using the set of offsets {1, 0, 0 −1} can be systematically used when processing a video sequence. In one embodiment, the Edge Offset direction can also be prefixed, for example to a by-default direction such as 90-degree direction. Of course a variant can consider calculating an Edge Offset direction at each new LCU, or at each new slice, or even at each new frame.

Embodiments can rely on non-systematic use of the same pixel-independent SAO parameters.

This is for example the case when the SAO filtering to apply to a frame area depends on SAO filtering applied to a co-located frame area in another frame and when a different behaviour is performed based on the SAO filtering type of the co-located frame area. For instance, by-default SAO parameters may be used for the SAO filtering of the frame area, when the SAO parameters determined for a co-located frame area in the other frame define no SAO filtering or a Band Offset filtering. On the contrary, the same SAO parameters, except the Edge Offset direction (which may be selected as perpendicular), as those determined for a co-located frame area in the other frame may be used for the SAO filtering of the frame area, when those determined parameters define an Edge Offset filtering.

Of course, other embodiments may provide that the Band Offset classification at a co-located frame area in the other frame is kept for the frame area being processed, while the Edge Offset classification is converted into another SAO filtering type, for example using the by-default SAO parameters. This variant still has low complexity.

Figure 15:
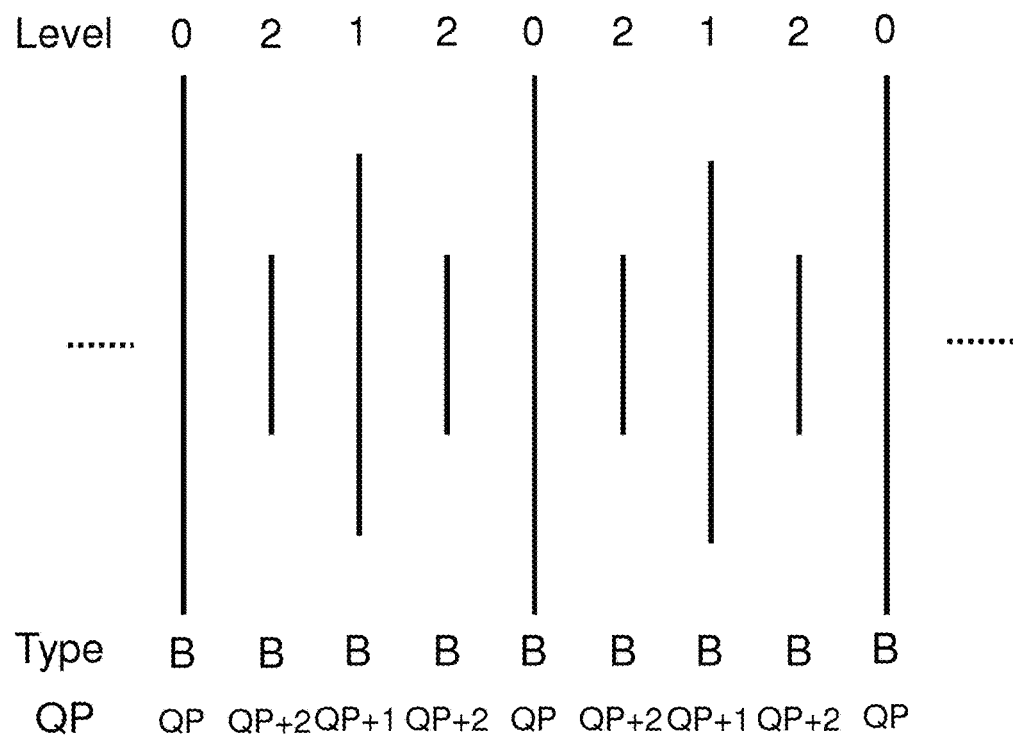
FIG. 15 illustrates the temporal prediction hierarchy implemented through INTER frame prediction.

Another example relies on the temporal prediction hierarchy illustrated in FIG. 15. As shown in this Figure, the frames of level 0 have reference frames for temporal (INTER) prediction from level 0 only; the frames of level 1 have reference frames for temporal prediction from levels 1 or 0; and the frames of level 2 have reference frames for temporal prediction from levels 0, 1 or 2. The level is also known as the temporal depth. With that hierarchy, usually the QP for a frame of level 0 is lower (i.e. offering better quality) than the QP of a frame of level 1. In the same way, the QP for a frame of level 1 is lower (i.e. offering better quality) than the QP of a frame of level 2.

Embodiments of the invention may enable or disable the implementation of a SAO filtering according to the invention or even any SAO filtering based on the level (temporal depth) of the frame considered. This is because some frames have more significant effect on video quality if they are degraded, in particular due to the fact that they may be reference frames for temporal prediction for a great number of other frames. A SAO filtering of frames having a low temporal depth will be preferably sought, compared to frames having a high depth.

For example, the SAO filtering may be enabled for frame areas belonging to a frame having a lower depth according to the temporal prediction frame hierarchy (e.g. level 0), the SAO filtering may be disabled for frame areas belonging to a frame having a higher depth according to the temporal prediction frame hierarchy (e.g. level 2), and enabling SAO filtering for frame areas belonging to a frame having a middle depth according to the temporal prediction frame hierarchy (e.g. level 1) may depend on quantization parameters associated with the lower, middle and higher depths. For example SAO filtering is enabled for level 1 if the difference between the QP parameters of levels 0 and 1 is greater than a threshold.

As described above, at least one of the SAO parameters is determined independently of the sample values of the frame area considered. That means that all or part of the SAO parameters embed this independency.

Usually, it is considered that the conventional SAO parameters are made of the SAO filtering type (sao_type_idx), the SAO-type-depending parameter (sao_eo_class indicating the Edge Offset direction, and sao_band_position) and the SAO offsets.

The at least one SAO parameter that is independent of the pixel values of the frame area subjected to SAO filtering preferably includes the SAO offsets. This is because substantial processing due to the multiplicity of the offsets can then be avoided.

Of course, variants may consider that the SAO filtering type or the SAO-type-depending parameter is said at least one SAO parameter independent of pixel values.

Preferably, the SAO offsets are always independent of the pixel values of the frame area. Then depending on the embodiments, the SAO filtering type may be added to the pixel-independent SAO parameters. Lastly, the SAO-type-depending parameter (Edge direction or Band start position) is a pixel-independent SAO parameter, thus resulting in a situation where all the SAO parameters are independent of the pixel values of the frame area.

Below the determination and/or selection of SAO offsets according to embodiments of the invention are first described. The determination and/or selection of SAO-type-depending parameter according to embodiments of the invention are then described.

For ease of explanation, most of the embodiments below are directed to Edge Offset filtering. This is because the latter is particularly suitable for correcting compression artifacts, while the Band Offset filtering consists in statistically moving the histogram of pixels.

In these embodiments, mechanisms can be used to determine the SAO filtering type using the invention or not (i.e. the SAO filtering type is determined independently of the pixel values filtered), and the invention is applied to the frame areas where Edge Offset filtering has been determined. In a particular embodiment, the SAO filtering type is forced to Edge Offset filtering for all the frame areas.

In a case where frame areas with SAO filtering type other than Edge Offset filtering (i.e. Band Offset filtering) survive, mechanisms can also be implemented to obtain SAO parameters (e.g. offsets) independent of the pixel values filtered, even if applying the invention to Band Offset filtering would tend to deteriorate video quality in a greater extent than for Edge Offset filtering.

As it will transpire from below, all the embodiments can be implemented at the encoder. Some of them can also be implemented at the decoder, thus providing that the corresponding pixel-independent SAO parameters no longer need to be transmitted in the bitstream. This saves bit rate of the encoded video sequence.

As to the determination and/or selection of SAO offsets, a plurality of embodiments is contemplated here below, which embodiments can be combined.

A first set of embodiments is directed to pre-selected SAO offsets. Various sets of four SAO offsets can be considered. However, the inventors have found that the four prefixed offsets equal to $\{1, 0, 0 -1\}$ provide good video quality while reducing processing complexity (none offset has to be computed) and bit rate required in the bitstream to transmit SAO parameters.

This example illustrates a case where the pixel-independent SAO parameter is not determined and not selected based on the original pixel values at the encoder (i.e. of the frame area before encoding). Since the same process can be performed at the decoder, the same SAO parameter can be inferred at the decoder, without the need to transmit it in the bitstream. Bitrate in the bitstream is thus saved. Many other embodiments below can be implemented at both the encoder and decoder, with the same result of avoiding transmission of one or more SAO parameters in the bitstream.

Another set of embodiments assumes that the SAO offsets O1, O2, O3, O4 for a frame area, typically a LCU, follows conventional HEVC rules regarding offset signs, namely that $O1 > O2 \geq 0 \geq O3 > O4$. This makes it possible to only determine the absolute value for each class. Moreover, it is assumed the following relationship between absolute values: $|O1|=|O4|$ and $|O2|=|O3|$, meaning that the absolute values of offsets from classes/categories 1 and 4 are equal one to each other, and that the absolute values of offsets from classes/categories 2 and 3 are also equal one to each other. This second assumption significantly reduces processing complexity since only two absolute values need to be obtained, from which the four offsets directly derive.

A particular embodiment provides that $O2=0=O3$. Then only one absolute value needs to be obtained, from which the two non-null offsets directly derive. Processing complexity is further reduced. This particular embodiment is compatible with the above four prefixed offsets $\{1, 0, 0 -1\}$.

In a variant, $|O2|=|O3|=|O1|/2$. Again, only one absolute value needs to be obtained, from which the two non-null offsets directly derive. Processing complexity is further reduced.

Another particular embodiment provides that the offsets depend on the quantization parameter QP used to decode a frame area of the encoded frames (i.e. at the inverse quantization 108' or 203 or 1306).

For example, the absolute values of the offsets is set equal to 1 or 0 if the QP is low (i.e. below a threshold) and set to 2 if the QP is high (i.e. above the threshold). For instance, $|O1|$ and $|O4|$, and more generally the absolute values of the offsets, are increased when a quantization parameter associated with the frame area considered exceeds a first threshold value, i.e. when the QP increases. This is illustrated below with reference to FIG. 16. In addition, $|O2|$ and $|O3|$ may derive from $|O1|$ and $|O4|$ as explained above.

The QP parameter includes frame QP, frame AQP and CU AQP.

When the SAO offsets are determined once for the whole frame, the QP parameter may only include frame QP and frame AQP.

For a frame level approach, this can depend on the frame level QP.

Another particular embodiment provides that the offsets depend on a size or number of transform units partitioning the frame area filtered. This means for example that if the residual of the LCU currently considered is coded with high transform sizes, the absolute offset values for classes/categories are incrementally set to a high level.

Also, where a LCU contains a large amount of TUs having non-zero residual, the absolute offset values for classes/categories are incrementally increased.

For instance, $|O1|$ and $|O4|$, and more generally the absolute values of the offsets, are increased when the size of the transform units exceeds a second threshold value, i.e. when the TU size increases. This is to compensate the artifacts introduced by the DCT transform and subsequent quantization, which artifacts may increase as the number of DCT coefficients increases (i.e. as the TU size increases).

Similarly, $|O1|$ and $|O4|$, and more generally the absolute values of the offsets, are increased when the number of the transform units exceeds a third threshold value, i.e. when the number of TUs increases. This is to compensate the artifacts at each TU, i.e. very numerous artifacts when the number of TUs increases.

These two cases are illustrated below with reference to FIG. 16. In addition, $|O2|$ and $|O3|$ may derive from $|O1|$ and $|O4|$ as explained above.

It is known that a LCU usually implements several transform sizes. In this situation, a representative transform size is selected from among the several sizes, which representative transform size is used to determine the SAO offset values. For example the largest transform size in the LCU may be chosen as representative transform size.

Another particular embodiment provides that the offsets depend on a bit depth used to store the pixel values. This may be used to scale the offsets as the bit depth used for the pixels varies. In this example, |O1| and |O4|, and more generally the absolute values of the offsets, are increased when the bit depth exceeds a fourth threshold value, i.e. when the bit depth increases. |O2| and |O3| may derive from |O1| and |O4| as explained above.

Figure 16:
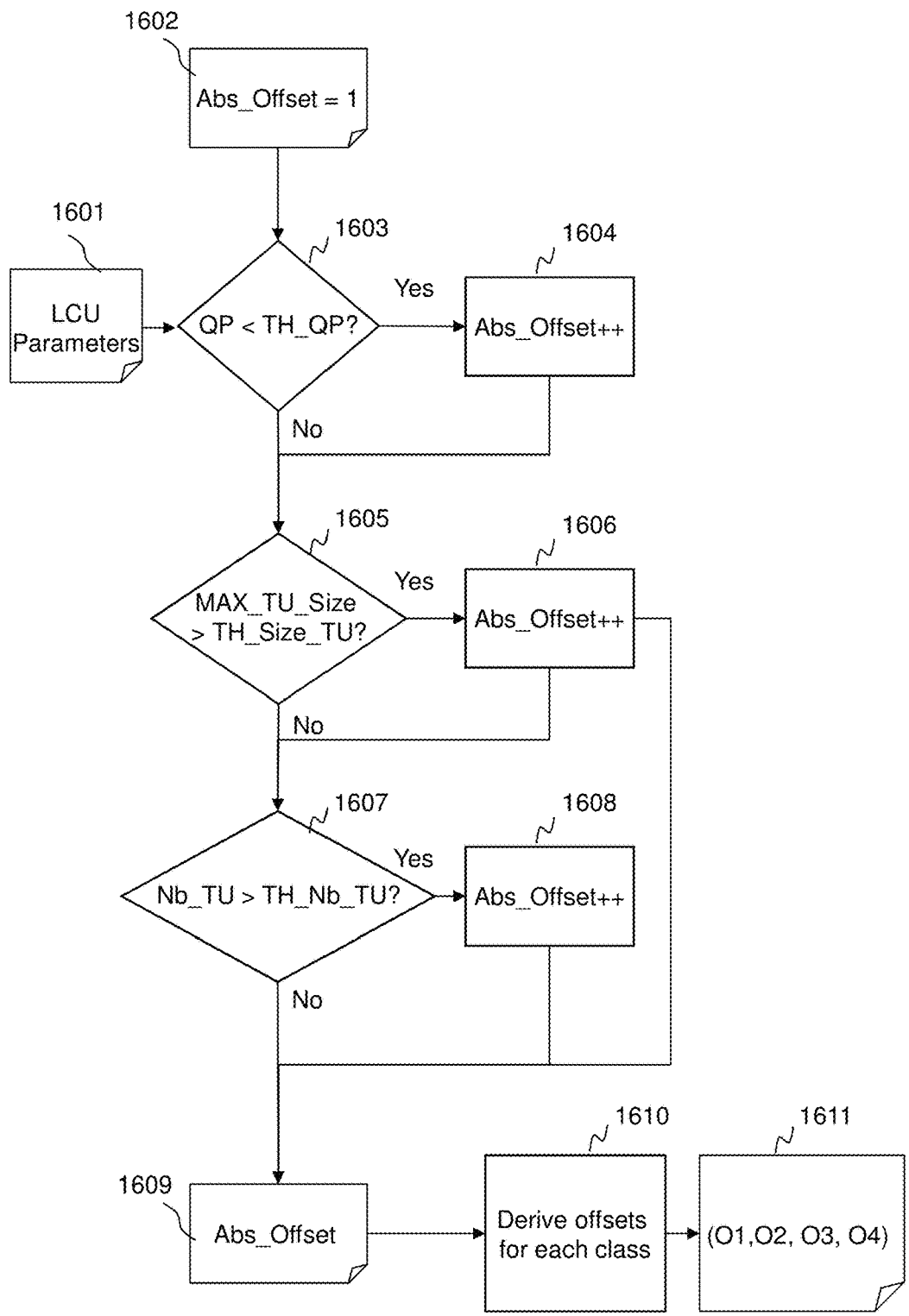
FIG. 16 is a flow chart illustrating steps of generating SAO offsets from data other than pixel values, according to an example.

FIG. 16 illustrates a combination of some of these embodiments to determine and select SAO offsets for a single LCU. This means that the same process is performed again for each new LCU.

Step 1601 consists in receiving parameters relating to the LCU currently considered, for example the QP parameter used at the inverse quantization 108' or 203 or 1306, as well as the partitioning of the LCU into TUs (thus providing the TU size and number).

At step 1602, a variable "Abs_Offset" is set to 1. This variable stores an offset value that is representative of all the four SAO offsets O1 to O4, in that the latter directly derive from Abs_Offset as explained below. The process of FIG. 16 consists in performing computational operations only with respect to the representative Abs_Offset, which is at last less complex than doing the same for four offsets.

Thus during the process of FIG. 16, Abs_Offset evolves until a final step where the four offsets O1 to O4 are derived with very low computational complexity.

The core of the process starts at step 1603 where the QP for the current LCU is compared to threshold TH_QP.

If QP<TH_QP, Abs_Offset is incremented by 1 at step 1604. This illustrates that the SAO offsets are increased when a quantization parameter associated with the frame area considered exceeds a first threshold value, i.e. when the QP increases.

After step 1604 or if QP≥TH_QP, the maximum TU size of the current LCU, MAX_TU_Size, is compared to a threshold size, TH_size_TU, at step 1605.

If MAX_TU_Size>TH_size_TU, Abs_Offset is incremented by 1 at step 1606 in order to produce the final value of Abs_Offset (i.e. the next step in that case is 1609). This illustrates that the SAO offsets are increased when the size of the transform units exceeds a second threshold value, i.e. when the TU size increases.

Otherwise (MAX_TU_Size≤TH_size_TU), the number of TUs corresponding to a non-zero residual in the current LCU, Nb_TU, is compared to a threshold number of TU, TH_Nb_TU, at step 1607.

If Nb_TU>TH_Nb_TU, Abs_Offset is incremented by 1 at step 1608. This illustrates that the SAO offsets are increased when the number of the transform units with a non-zero residual exceeds a third threshold value, i.e. when the number of TUs with a non-zero residual given the frame area LCU increases.

After step 1608 or if Nb_TU≤TH_Nb_TU, the process continues to step 1609.

At step 1609, the value Abs_Offset obtained is used to derive the four offsets O1 to O4 at step 1610. Block 1611 represents the four SAO offsets obtained.

Various derivation schemes can be implemented, including the relationships proposed above between |O1|, |O2|, |O3| and |O4|. For the purpose of illustration, the following rules that require very low complexity may be used:

$O1=$Abs_Offset; $O4=-$Abs_Offset; $O2=O1/2$; and $O3=-O2$.

As to the determination and/or selection of SAO-type-depending parameter, namely Edge Offset direction, a plurality of embodiments is contemplated here below, which embodiments can be combined.

Determination of an Edge Offset direction at the frame level is first considered using a first set of embodiments.

Embodiments contemplate the removal of Edge classes, i.e. of Edge directions. This is for example the case in one embodiment where the Edge Offset direction (used as a pixel-independent SAO parameter according to the invention) is fixed in advance for a plurality of frames of the video sequence. This makes it possible to use the same Edge Offset direction for all the frames. One can easily understand that processing complexity is reduced. In addition, as the decoder may also know the pre-fixed direction, there is no need to transmit this information in the bitstream.

For example, the pre-fixed direction can be the first Edge Offset direction, equal to 0-degree direction. In particular, the pre-fixed direction may be used when SAO filtering an up-sampled decoded base frame, a Diff mode frame or a Base Mode prediction image introduced above in relation with the scalable video coding.

With little additional complexity, an embodiment provides that the Edge Offset direction is selected for each new frame within the video sequence, for example based on a picture order count (POC) associated with each new frame: Edge Offset direction=POC mod(3), where mod(x) is the modulo operation. The POC information is known by the decoder, thus avoiding the transmission of the Edge Offset directions to the decoder in this embodiment.

Determination of an Edge Offset direction at the LCU level is now considered using another set of embodiments.

Embodiments can use the same mechanisms as those described above at the frame level. These embodiments at the LCU and frame levels may involve favoring vertical (90°) and horizontal (0°) Edge Offset directions for selection compared to diagonal Edge Offset directions (45° and 135°). In some embodiments, the diagonal Edge Offset directions may be disabled for selection. These embodiments aim at further decreasing complexity since fewer directions are considered or the directions with simpler processing are favored.

Other embodiments at the LCU level consider the SAO parameters obtained for a co-located LCU in another frame. In most embodiments, the other frame is another temporal frame of the video sequence having the same temporal depth (as described above with reference to FIG. 15) or a lower temporal depth. Other embodiments consider other frames, for example a base frame when processing an enhancement frame that temporally coincides. This example is advantageously used when SAO filtering the up-sampled decoded base frame, the Diff mode frame or the Base Mode prediction image as suggested above.

If the frame currently considered and the other frame have the same size and the same partioning into LCUs, there is no difficulty to identify the co-located LCU. Some cases are more complicated where several LCUs in the other frame spatially correspond to a single LCU in the current frame. In that case, several approaches may be implemented, for instance using the first LCU (top left) or using the LCU in the other frame that overlaps the most of the LCU currently considered or using the largest LCU, or a combination thereof.

An embodiment already introduced above includes obtaining SAO parameters for a frame (other than the frame currently processed, i.e. having a different time) using a rate distortion SAO criterion. By-default SAO parameters may be used for the current LCU if the SAO parameters determined for a co-located LCU in the other frame define no SAO filtering or a Band Offset filtering. By-default SAO parameters can for example be an Edge Offset filtering with 0-degree direction, using the offsets {1, 0, 0, −1}. On the contrary, if the parameters determined for the co-located LCU define an Edge Offset filtering, the same SAO parameters can be used for SAO-filtering the current LCU. However, a particular embodiment provides that the Edge Offset direction is replaced by its perpendicular.

This is a specific example for more general embodiments according to which the Edge Offset direction selected for the current LCU is perpendicular to an Edge Offset direction determined for a co-located frame area in another frame of the video sequence.

The rate distortion SAO criterion may be used for example to select the SAO filtering to apply to a current LCU or frame, between a conventional SAO filtering and a SAO filtering using the above-defined by-default SAO parameters.

For instance, if the rate distortion gain obtained when using the by-default SAO parameters exceeds a threshold, it may be worth using such by-default SAO parameters instead of applying a conventional SAO filtering that requires a great number of computational operations.

Turning now to other embodiments, a first particular embodiment provides that the Edge Offset direction selected for the current LCU is determined based on a motion vector associated with the frame area considered.

Motion vectors have been defined above in relation with temporal prediction. Several motion vectors can be obtained for a given LCU, thus resulting in that a "representative" motion vector should be selected. For purposed of illustration, the representative motion vector for an LCU can be an average or weighted average of the motion vectors in the current LCU, or the centered motion vector of the LCU, or a median value of all motion vectors in the LCU.

Once the representative motion vector is known, the Edge Offset direction selected for the current LCU may be selected as the closest direction to a perpendicular of the representative motion vector, from amongst predefined directions (from the four conventional Edge Offset directions).

For example, the representative motion vector (mv_x, mv_y) is converted in a polar coordinate system or angular domain (d, θ). The value (θ+90°) is then compared to the angle of the conventional Edge Offset directions (0°, 45°, 90°, 135°) and the closest one (i.e. with the minimum absolute distance with (θ+90°)) is selected as the Edge Offset direction for the current LCU. If mv_x and mv_y are both equal to 0, the Edge Offset direction is set to by-default SAO parameters or determined by another mechanism.

A second particular embodiment provides that the Edge Offset direction selected for the current LCU is determined based on a direction for spatial prediction associated with the reconstructed frame area.

Spatial prediction direction has been defined above in relation with spatial prediction. Several spatial prediction directions can be obtained for a given LCU, thus resulting in that a "representative" spatial prediction direction should be selected. For purposed of illustration, the representative spatial prediction direction for an LCU can be an average or weighted average of the spatial prediction directions in the current LCU, or the centered spatial prediction direction of the LCU, or a median value of all spatial prediction directions in the LCU. The average or the median can take into account only the angular spatial prediction directions and not the DC and planar mode of Intra prediction.

Once the representative spatial prediction direction is known, the Edge Offset direction selected for the current LCU may be selected as the closest direction to a perpendicular of the spatial prediction direction, from amongst predefined directions (from the four conventional Edge Offset directions).

For example, the representative spatial prediction direction is converted into an angle θ (in a polar coordinate system). The value (θ+90°) is then compared to the angle of the conventional Edge Offset directions (0°, 45°, 90°, 135°), and the one having the minimum absolute distance with (θ+90°) is selected as the Edge SAO Offset for the current LCU. If no angular mode is determined, the Edge Offset direction is set to by-default SAO parameters or determined by another mechanism.

Cascading several SAO filtering has been briefly suggested above, each cascaded SAO filtering being based on respective sets of SAO parameters, wherein at least one SAO parameter of each respective set of SAO parameters is determined independently of the sample values of the reconstructed frame area.

The embodiments described above may all be recycled with respect to one or several of the cascaded SAO filtering.

Four cascaded SAO filtering may be provided, each having a pre-fixed Edge Offset direction. For example, the four cascaded SAO filtering implement the four conventional Edge Offset directions. The same offsets, e.g. {1, 0, 0 −1}, can be used or not by each cascaded SAO filtering.

Where the encoder would be designed to select and cascade all or part of the four Edge Offset directions, four specific flags are provided in the bitstream to indicate to the decoder which of the four directions are actually used (enabled or not). The flags are inserted at the LCU level or the slice level or the frame level depending on the level at which the four directions are considered again with a view of selecting all or part of them.

An example where not all four Edge Offset directions are cascaded is the following: the Edge Offset direction retrieved from a co-located LCU in another frame (base frame, another temporal frame in the video sequence) is not used, but only the three other directions are cascaded in three SAO filtering, for example in degree increasing order.

In an embodiment, the direction of the SAO filtering first occurring in the cascade is determined based on an Edge Offset direction determined for a co-located frame area in another frame of the video sequence. The other Edge Offset directions (here the three other or less conventional Edge Offset directions) are implemented in the following cascaded SAO filterings according to a predefined order, e.g. a degree increasing order.

In an embodiment taking advantage of INTER prediction information, the direction of the SAO filtering first occurring in the cascade is determined based on a motion vector associated with the frame area considered. The other Edge Offset directions are implemented in the following cascaded SAO filterings according to a predefined order, e.g. a degree increasing order.

In an embodiment taking advantage of INTRA prediction information, the direction of the SAO filtering first occurring in the cascade is determined based on a direction for spatial prediction associated with the frame area considered. The other Edge Offset directions are implemented in the following cascaded SAO filterings according to a predefined order, e.g. a degree increasing order.

The above examples are merely embodiments of the invention, which is not limited thereby.

The invention claimed is:

1. A method of encoding or decoding a video sequence, the method comprising processing an encoded frame to produce reference blocks usable to predict another frame of the video sequence, wherein processing the encoded frame comprises:

obtaining a reconstructed frame area made of an array of sample values; and applying a sample adaptive offset (SAO) filtering to the reconstructed frame area based on SAO parameters;

wherein, when SAO filtering is applied, a SAO filtering type is Edge offset filtering, and vertical and horizontal Edge Offset directions are selected for a plurality of frames of the video sequence as SAO-type-depending parameter, wherein the vertical and horizontal Edge Offset directions are selected independently of the sample values of the reconstructed frame.

2. The method of claim 1, wherein the same four prefixed offsets equal to {1, 0, 0 −1} are used whenever SAO filtering is applied.

3. The method of claim 1, wherein offsets used as SAO parameters includes four offsets O1, O2, O3, O4 such that O1>O2≥0≥O3>O4 and |O1|=|O4| and |O2|=|O3|, where |x| is the absolute value of x; and the offsets depend on a quantization parameter used to decode a frame area of the encoded frame.

4. The method of claim 1, wherein the SAO filtering type has a value selected independently of the sample values of the reconstructed frame area from among a plurality of predetermined values.

5. The method of claim 4, wherein the SAO filtering type is set to Edge Offset filtering whenever SAO filtering is applied.

6. The method of claim 1, wherein the Edge Offset direction is selected for each new frame within the video sequence to which SAO filtering is applied, based on a picture order count associated with each new frame.

7. The method of claim 1, wherein the diagonal Edge Offset directions are disabled for selection.

8. The method of claim 1, wherein frames of the video sequence are encoded using temporal prediction according to a temporal prediction frame hierarchy between frames; and the SAO filtering is enabled for frame areas belonging to a frame having a lower depth according to the temporal prediction frame hierarchy, the SAO filtering is disabled for frame areas belonging to a frame having a higher depth according to the temporal prediction frame hierarchy, and enabling SAO filtering for frame areas belonging to a frame having a middle depth according to the temporal prediction frame hierarchy depends on quantization parameters associated with the depths or on Lagrange parameter λ.

9. The method of claim 1, wherein SAO parameters are determined for another frame of the video sequence; and the SAO parameters to be used for SAO-filtering the reconstructed frame area are:

by-default SAO parameters if the SAO parameters determined for a co-located frame area in the other frame define no SAO filtering or a Band Offset filtering, the same SAO parameters, except a perpendicular Edge Offset direction, as those determined for a co-located frame area in the other frame if those determined parameters define an Edge Offset filtering.

10. The method of claim 1, further comprising cascading several SAO filterings on the reconstructed frame area based on respective sets of SAO parameters, wherein at least one SAO parameter of each respective set of SAO parameters is determined independently of the sample values of the reconstructed frame area.

11. The method of claim 10, wherein three Edge Offset SAO filterings are cascaded corresponding to three Edge Offset directions that are different from an Edge Offset direction determined for a co-located frame area in another frame of the video sequence.

12. The method of claim 10, wherein the bitstream comprises a plurality of flags to specify whether associated Edge Offset directions are enabled or not.

13. The method of claim 10, wherein the direction of the SAO filtering first occurring in the cascade is determined based on an Edge Offset direction determined for a co-located frame area in another frame of the video sequence.

14. The method of claim 10, wherein the several cascaded SAO filterings uses the same set of offsets.

15. A device for encoding or decoding a video sequence, comprising an internal processor configured to process an encoded frame to produce reference blocks usable to predict another frame of the video sequence, wherein the internal processor comprises:

a frame area module configured to obtain a reconstructed frame area made of an array of sample values;

a sample adaptive offset, (SAO) filter configured to apply a SAO filtering to the reconstructed frame area based on SAO parameters; and a SAO parameter determining module configured to, when said SAO filtering is Edge offset filtering and vertical and horizontal Edge Offset directions are selected for a plurality of frames of the video sequence as SAO-type-depending parameter applied by the SAP filter, to select the vertical and horizontal Edge Offset directions independently of the sample values of the reconstructed frame.

16. The device of claim 15, wherein frames of the video sequence are encoded using temporal prediction according to a temporal prediction frame hierarchy between frames; and the device is configured to enable SAO filtering for frame areas belonging to a frame having a lower depth according to the temporal prediction frame hierarchy, to disable SAO filtering for frame areas belonging to a frame having a higher depth according to the temporal prediction frame hierarchy, and to enable SAO filtering for frame areas belonging to a frame having a middle depth according to the temporal prediction frame hierarchy depending on quantization parameters associated with the depths or on Lagrange parameter λ.

17. The device of claim 15, wherein SAO parameters are determined for another frame of the video sequence; and the SAO parameters to be used for SAO-filtering the reconstructed frame area are: by-default SAO parameters if the SAO parameters determined for a co-located frame area in the other frame define no SAO filtering or a Band Offset filtering, the same SAO parameters, except a perpendicular Edge Offset direction, as those determined for a co-located frame area in the other frame if those determined parameters define an Edge Offset filtering.

18. The device of claim 15, comprising several SAO filters in cascade to cascade several SAO filterings on the reconstructed frame area based on respective sets of SAO parameters, wherein at least one SAO parameter of each respective set of SAO parameters is determined independently of the sample values of the reconstructed frame area.

19. A non-transitory computer-readable medium storing a program which, when executed by a microprocessor or computer system in a device, causes the device to perform an encoding or a decoding of a video sequence by processing an encoded frame to produce reference blocks usable to predict another frame of the video sequence, wherein processing the encoded frame comprises:
- obtaining a reconstructed frame area made of an array of sample values; and
- applying a sample adaptive offset (SAO) filtering to the reconstructed frame area based on SAO parameters,
- wherein, when SAO filtering is applied, a SAO filtering type is Edge offset filtering, and vertical and horizontal Edge Offset directions are selected for a plurality of frames of the video sequence as SAO-type-depending parameter
- wherein the vertical and horizontal Edge Offset directions are selected independently of the sample values of the reconstructed frame.

* * * * *